June 5, 1962 H. E. KLOSS 3,037,481
AUTOMATIC MILK FOOD MIXER AND SUCKLING ANIMAL FEEDER
Filed July 21, 1960 9 Sheets-Sheet 2
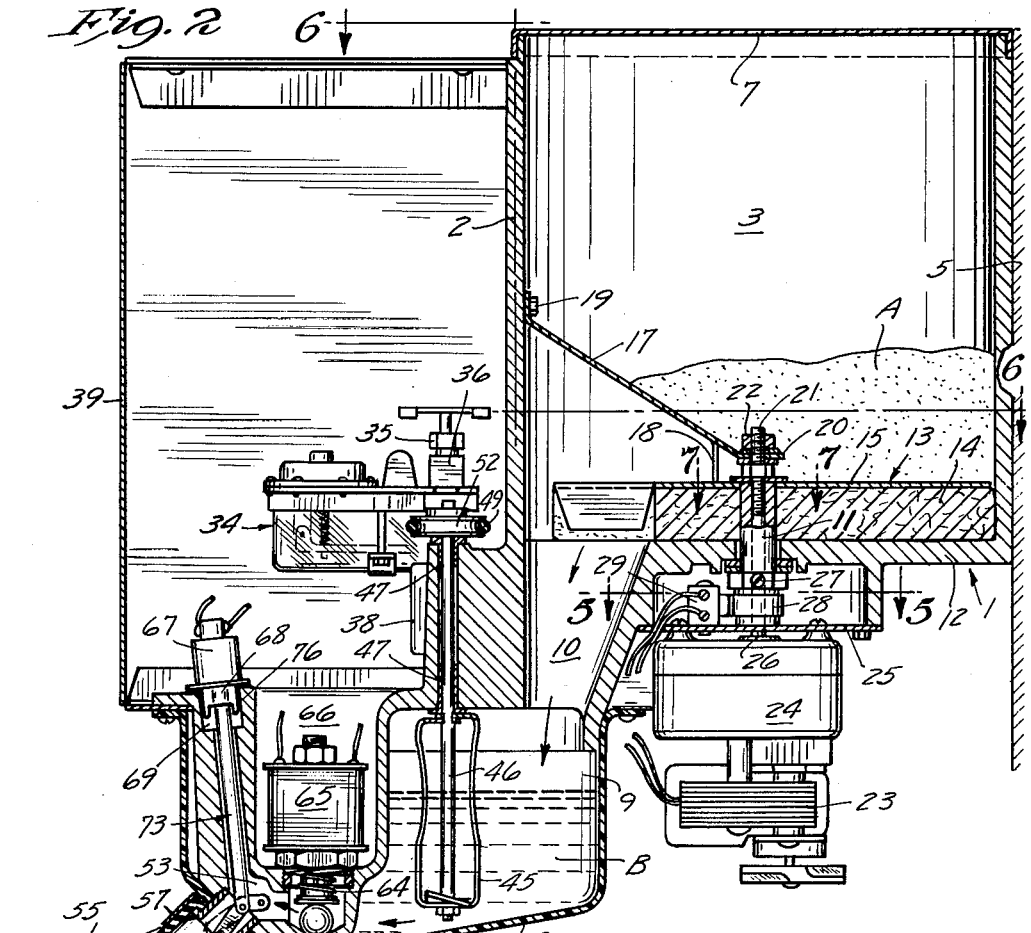
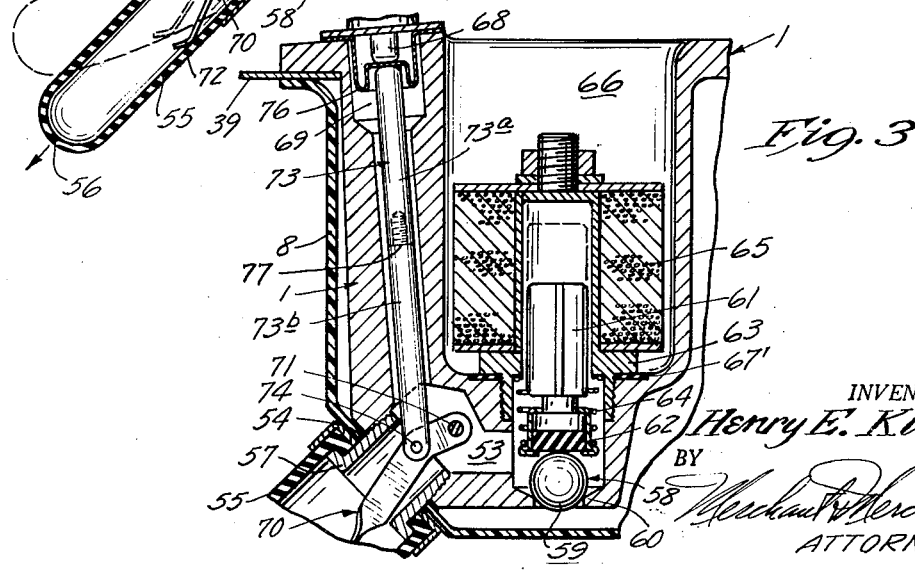
INVENTOR.
Henry E. Kloss
BY
Merchant & Merchant
ATTORNEYS June 5, 1962 H. E. KLOSS 3,037,481
AUTOMATIC MILK FOOD MIXER AND SUCKLING ANIMAL FEEDER
Filed July 21, 1960 9 Sheets-Sheet 3
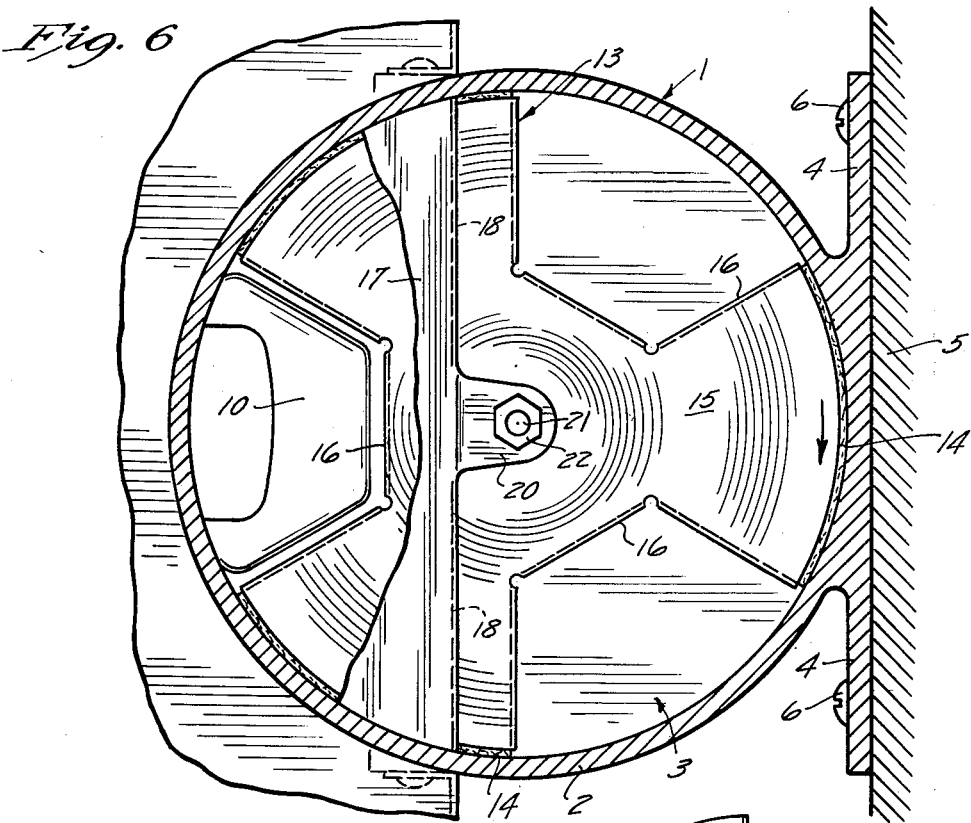
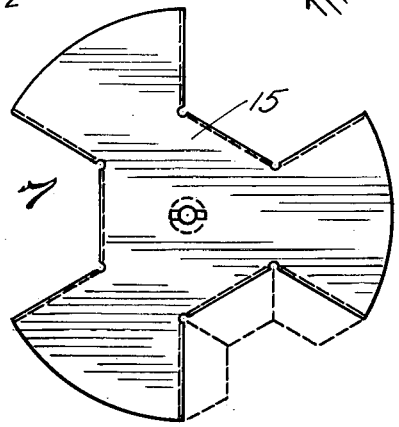
INVENTOR.
Henry E. Kloss
BY
Merchant & Merchant
ATTORNEYS June 5, 1962 H. E. KLOSS 3,037,481
AUTOMATIC MILK FOOD MIXER AND SUCKLING ANIMAL FEEDER
Filed July 21, 1960 9 Sheets-Sheet 4

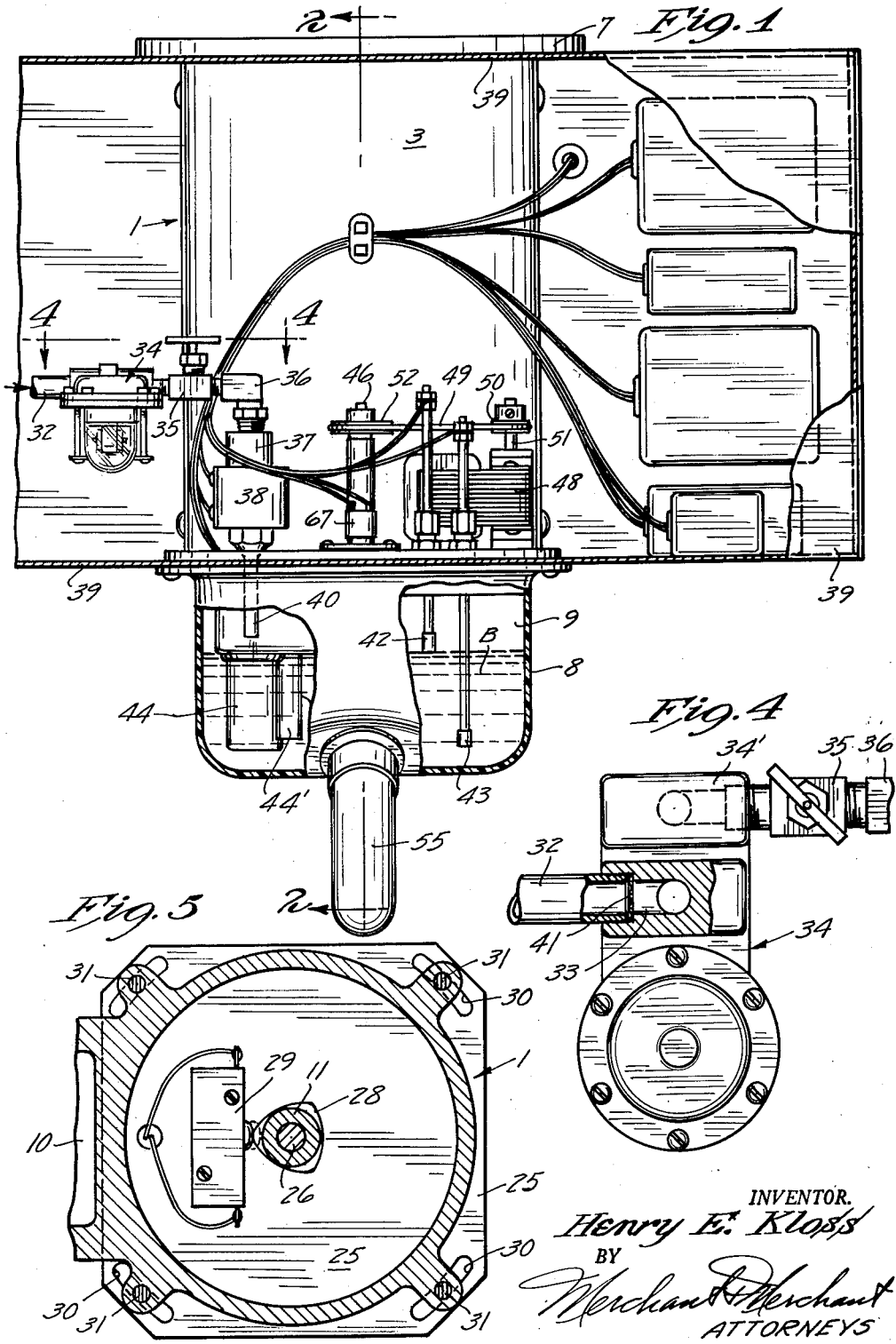

INVENTOR.
Henry E. Kloss
BY
Merchant & Merchant
ATTORNEYS

June 5, 1962            H. E. KLOSS            3,037,481
AUTOMATIC MILK FOOD MIXER AND SUCKLING ANIMAL FEEDER
Filed July 21, 1960            9 Sheets-Sheet 5
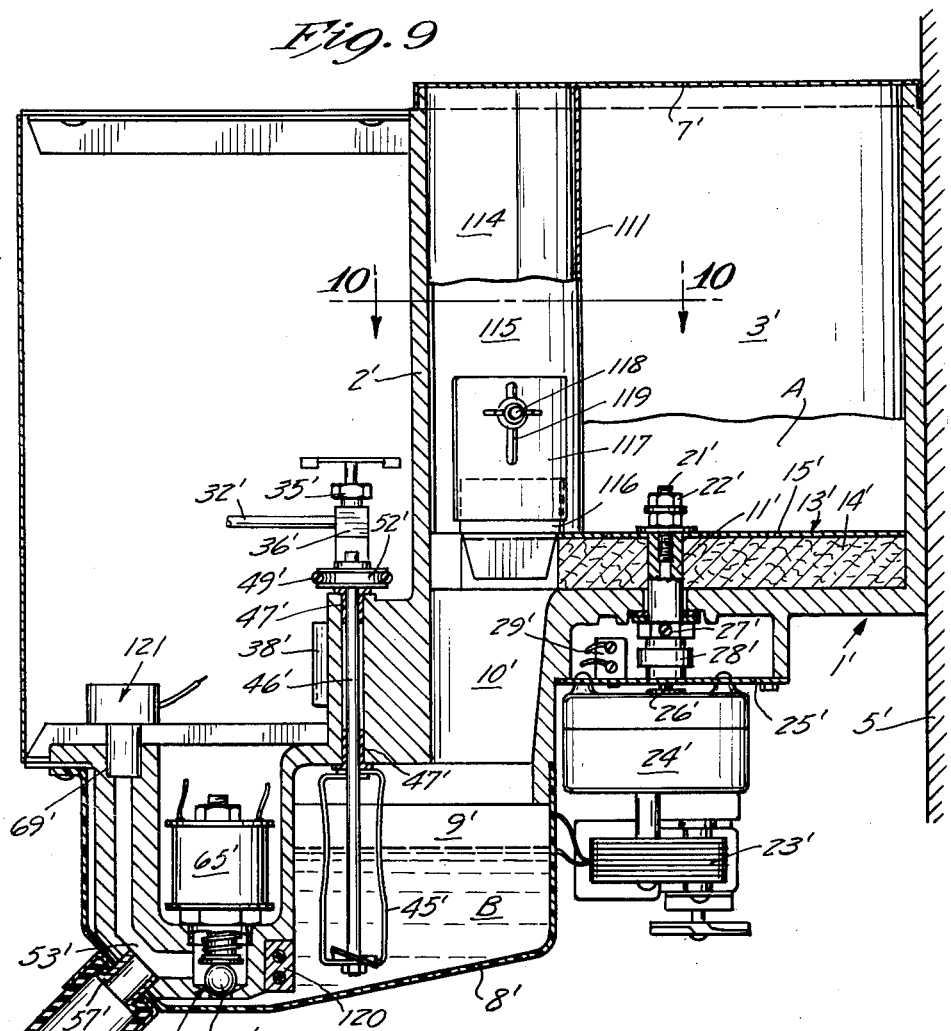
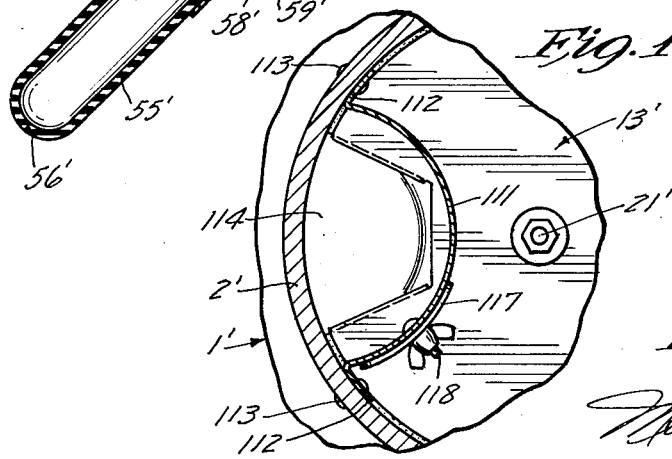
INVENTOR.
Henry E. Kloss
BY
Merchant & Merchant
ATTORNEYS

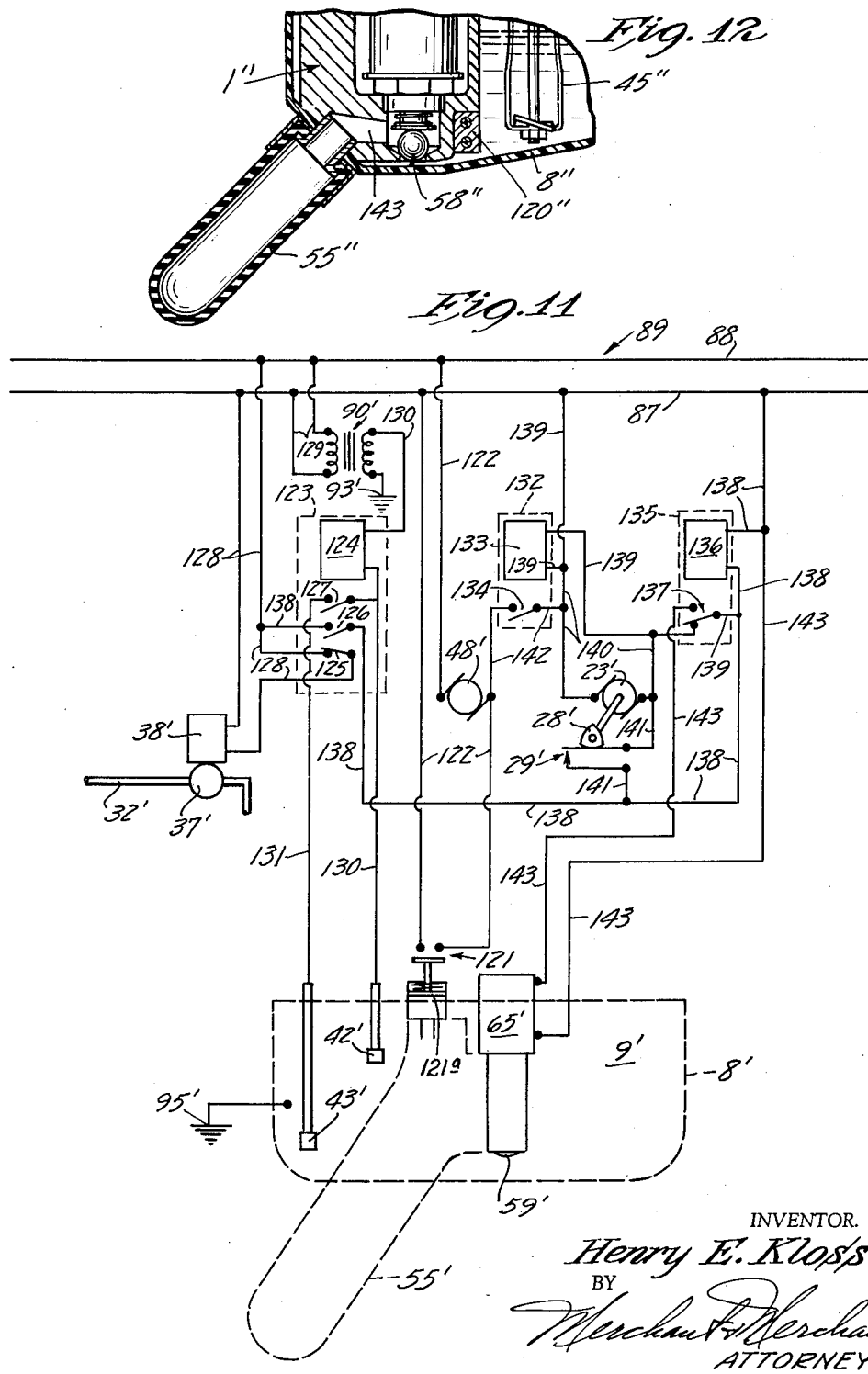

June 5, 1962 H. E. KLOSS 3,037,481
AUTOMATIC MILK FOOD MIXER AND SUCKLING ANIMAL FEEDER
Filed July 21, 1960 9 Sheets-Sheet 7
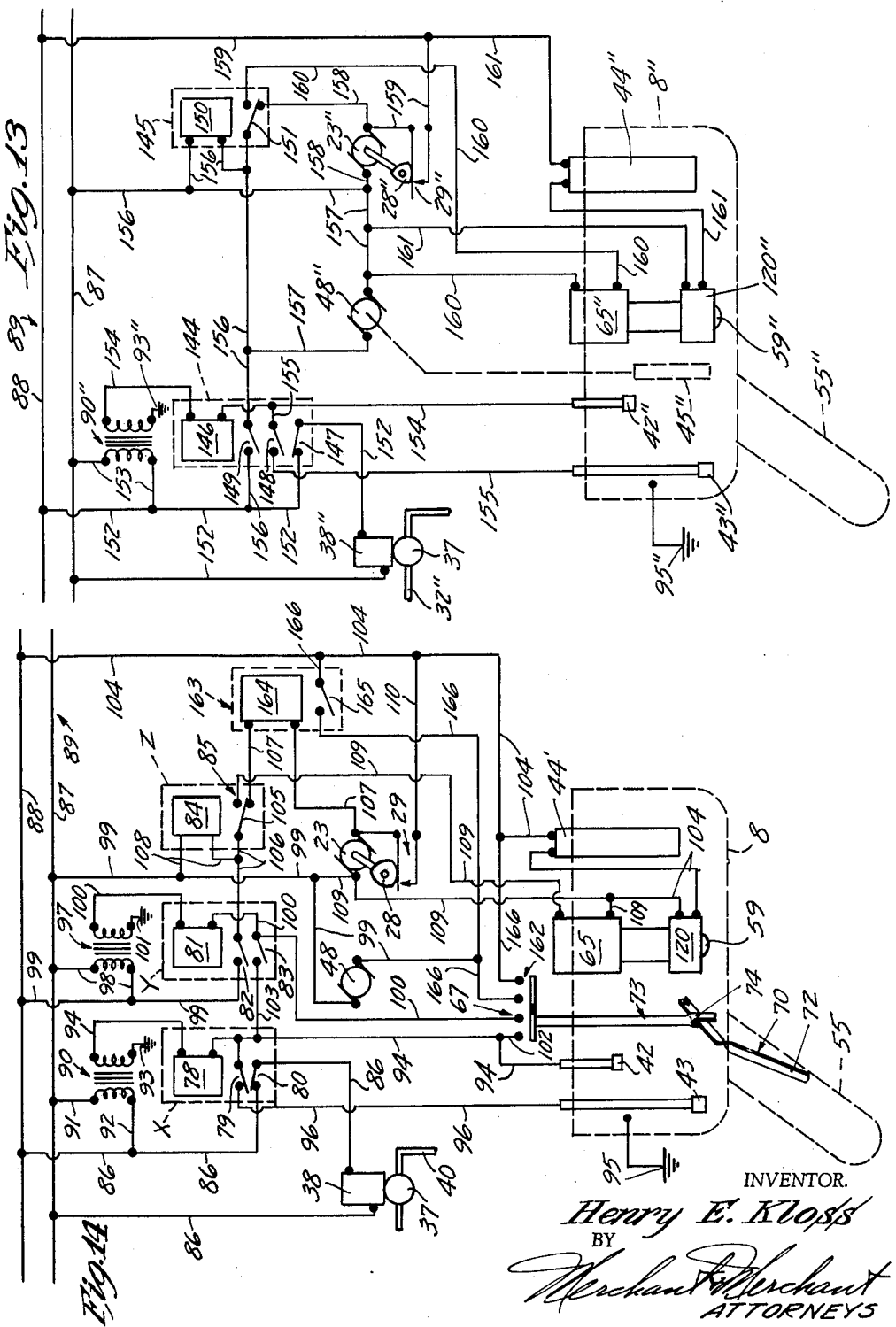
INVENTOR.
Henry E. Kloss
BY
Merchant & Merchant
ATTORNEYS

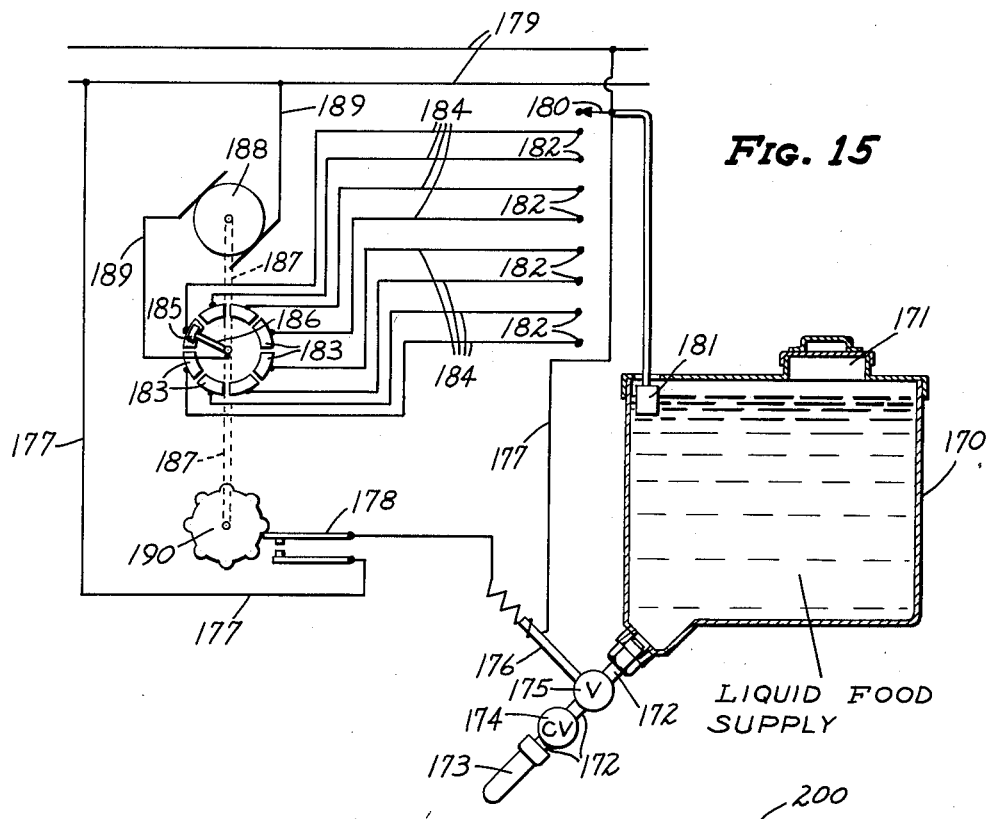
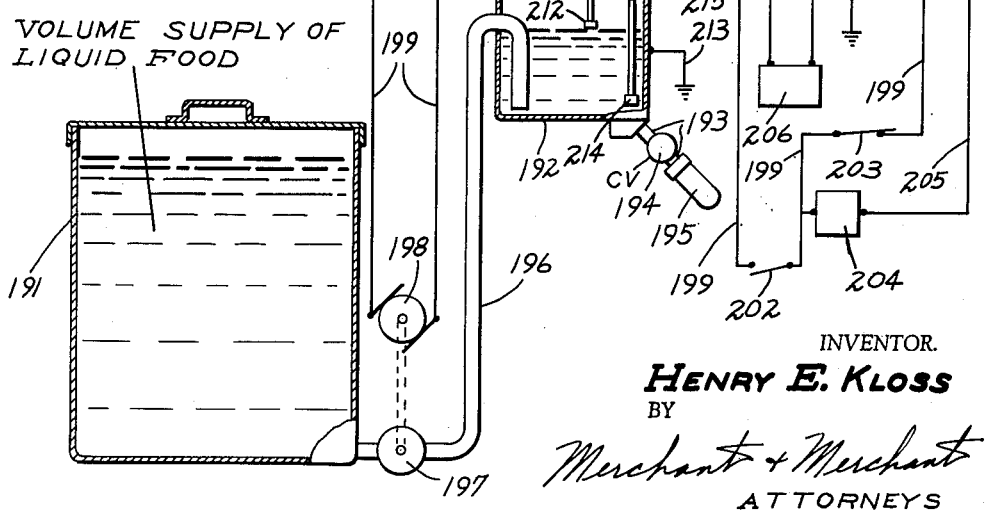

June 5, 1962  H. E. KLOSS  3,037,481
AUTOMATIC MILK FOOD MIXER AND SUCKLING ANIMAL FEEDER
Filed July 21, 1960  9 Sheets-Sheet 9
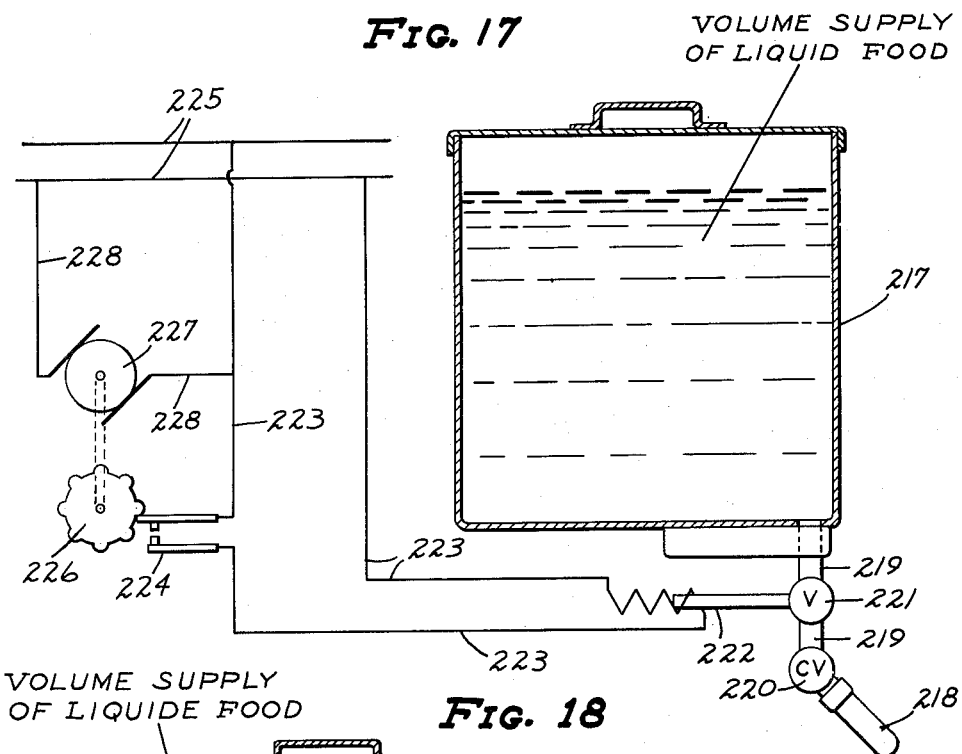
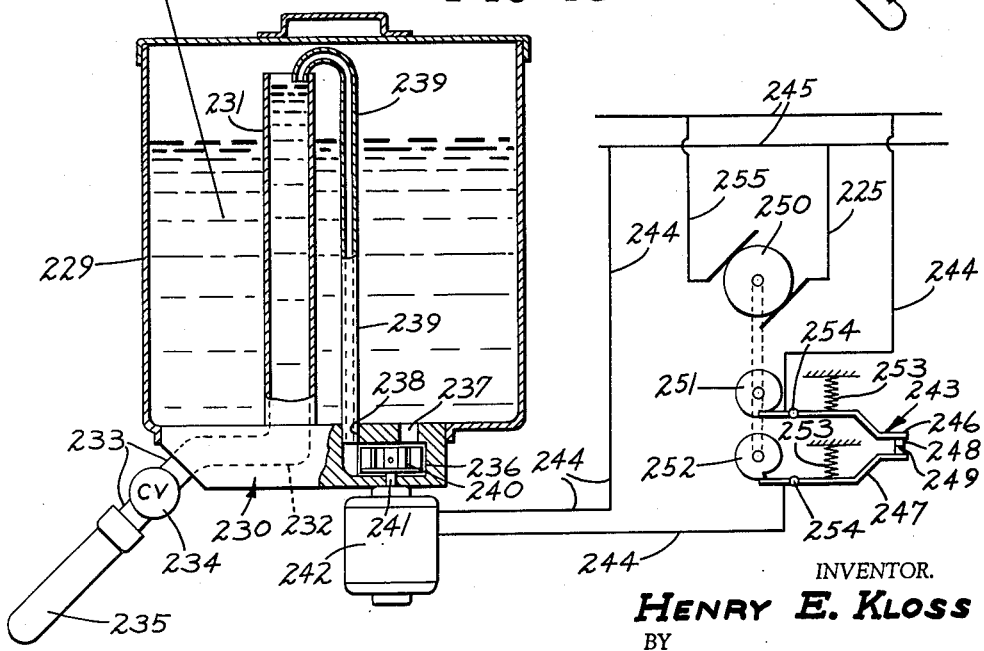
INVENTOR.
HENRY E. KLOSS
BY
Merchant & Merchant
ATTORNEYS 3,037,481
AUTOMATIC MILK FOOD MIXER AND SUCKLING ANIMAL FEEDER
Henry E. Kloss, Minneapolis, Minn., assignor to K & K Manufacturing, Inc., Minneapolis, Minn., a corporation of Minnesota
Filed July 21, 1960, Ser. No. 44,473
33 Claims. (Cl. 119—71)

This application is a continuation-in-part of my copending United States application, Serial No. 681,132, filed August 26, 1957, which in turn is a continuation-in-part of my abandoned application Serial No. 607,758, filed September 4, 1956, and entitled "Automatic Milk Food Mixer and Calf Feeder."

My present invention relates generally to feeding devices for livestock, and more particularly to such devices incorporating means for mixing dry food with liquid prior to delivery of the mixture to said livestock.

Extensive tests have shown that nursing calves do not always consume all of the cow's milk at a given feeding and that milk remaining in the cow's udder causes subsequent reduction in milk production. For this reason, many dairy farmers separate the calves from their cows after the first day and feed the calves from nipple equipped pails or like containers while milking the cows in the usual manner, thus obtaining all of the milk at each milking and insuring continued high milk production.

Inasmuch as a second purpose for the use of the above-mentioned nipple equipped receptacles is the savings of time and labor, these receptacles are usually filled once a day with a relatively large quantity of liquid milk or milk replacer food in liquid form. Since the liquid milk or milk replacer food should be fed at warm temperature, souring of the liquid frequently occurs when the same is unused in a matter of hours, rendering the same unpalatable. This not only upsets the day's feeding, but often contaminates the feeding equipment and requires a complete washing and sterilization thereof.

It has been further found that the growth and well-being of calves and other young livestock is improved by feeding the same numerous small portions of the liquid food per day rather than feeding them in one or two large doses. Moreover, when large batches or quantities of food are available, the young animals are often apt to consume a day's supply in one or two feedings early in the day, with the result that they become hungry during the latter part of the day. Then, unless the receptacles are refilled, the animals go hungry until the following morning. Obviously, refilling the receptacles during the latter part of the day consumes time and effort, thus defeating one of the purposes of such a device.

An important object of my invention is the provision of an animal feeding device from which a plurality of feedings or doses of predetermined quantity may be obtained over a given extended period of time with a single loading, and in which stored food will not spoil between feedings. To this end, I provide structure defining a reservoir for finely divided dry food, such as commercially available relatively stable powdered or granular milk replacer, and a mixing chamber having an outlet in its bottom portion. I further provide a feeding nipple connected to the outlet of the mixing chamber, means for introducing a predetermined quantity of liquid such as water to the mixing chamber, and means for dispensing a predetermined quantity of the finely divided dry food to the mixing chamber for mixing with the water therein prior to discharge of the mixture to the feeding nipple. The above described machine further includes means for heating the liquid in the chamber and maintaining the same at a predetermined temperature, and a power driven agitator for thoroughly mixing the dry food dispensed from the reservoir to the mixing chamber with the liquid in the mixing chamber.

Another highly important object of my invention is the provision of an automatic liquid food mixer and animal feeder in which the dry food is kept isolated from water in the mixing chamber until an effort is made by an animal to obtain food from the feeding nipple.

Another object of my invention is the provision of novel control means whereby water is introduced to the mixing chamber only during an idle period of the machine, and in which the machine is held inoperative to mix dry food with water in the chamber until the water therein reaches a predetermined high level, the time consumed in filling of the mixing chamber from a predetermined low level to a predetermined high level approximating the desired normal minimum time interval between calf feedings.

Another object of my invention is the provision of a discharge valve in the outlet between the interior of the mixing chamber and the feeding nipple, valve operating mechanism, and control means rendering said valve incapable of opening for a predetermined time interval after dispensing of a quantity of dry food from the reservoir to the mixing chamber, and initiation of operation of the agitator in the mixing chamber, whereby to permit the dry food to become thoroughly mixed or dissolved in the liquid prior to discharging of the mixture to the feeding nipple.

Still another object of my invention is the provision of a novel control element operatively associated with the feeding nipple, and operative responsive to manipulation of the feeding nipple by a suckling animal to initiate the dispensing of dry food to liquid in the mixing chamber, mixing thereof and delivery of the mixture to the feeding nipple through the aforementioned valve.

In practice, it has been found that calves as well as other suckling animals awaken and feed during the night so that liquid food mixed in small quantities does not necessarily stand for a long period of time between feedings, and that the dry food and liquid, such as water, may be mixed prior to demand by the animal. Hence, another object of my invention is the provision of mechanism for feeding liquid and dry food to a mixing chamber, discharge valve mechanism for the mixed food material, and novel control means for said mechanisms, whereby food cannot be obtained by the suckling animal until thoroughly mixed, and whereby a new batch of food will not be prepared until that contained in the mixing chamber is substantially consumed.

An important feature of the invention, common to all forms disclosed herein, resides in the provision of novel means for providing a time delay period between feedings available after the nipple, to discourage an animal from a second feeding and give other hungry animals opportunity to feed in turn at the same nipple.

Another object of my invention is the provision of an automatic liquid food mixer and animal feeder which is relatively simple and inexpensive to manufacture, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views:

FIG. 1 is a view in front elevation of an automatic liquid food mixer and feeder, built in accordance with my invention, some parts being broken away and some parts being shown in section;

FIG. 2 is a vertical section taken substantially on the line 2—2 of FIG. 1;

FIG. 3 is an enlarged detail corresponding to a portion of FIG. 2;

FIG. 4 is an enlarged fragmentary detail in plan as seen from the line 4—4 of FIG. 1, some parts being broken away and some parts being shown in section;

FIG. 5 is an enlarged fragmentary horizontal section taken on the line 5—5 of FIG. 2;

FIG. 6 is an enlarged fragmentary view partly in plan and partly in horizontal section, taken substantially on the irregular line 6—6 of FIG. 2;

FIG. 7 is a view in plan of a cover plate of a dry food dispensing element of my invention;

FIG. 9 is a view corresponding to FIG. 2 but showing a modified form of my novel food mixer and feeder.

FIG. 10 is a fragmentary horizontal section taken substantially on the line 10—10 of FIG. 9;

FIG. 11 is a wiring diagram of the control system of the device of FIGS. 9 and 10;

FIG. 12 is a fragmentary view corresponding to a portion of FIGS. 2 and 9 but showing a still further modification;

FIG. 13 is a wiring diagram of the control system for the device having the arrangement illustrated in FIG. 12;

FIG. 14 is a wiring diagram showing a still further modified form of control system;

FIG. 15 is a view partly in vertical section and partly diagrammatic, showing another modified form of feeding device;

FIG. 16 is a view partly in side elevation, partly in section, and partly diagrammatic, showing a still further modified form;

FIG. 17 is a diagrammatic view showing still another modification; and

FIG. 18 is a view partly in vertical section and partly diagrammatic, showing a still further modified form of feeding device.

Figure 8:
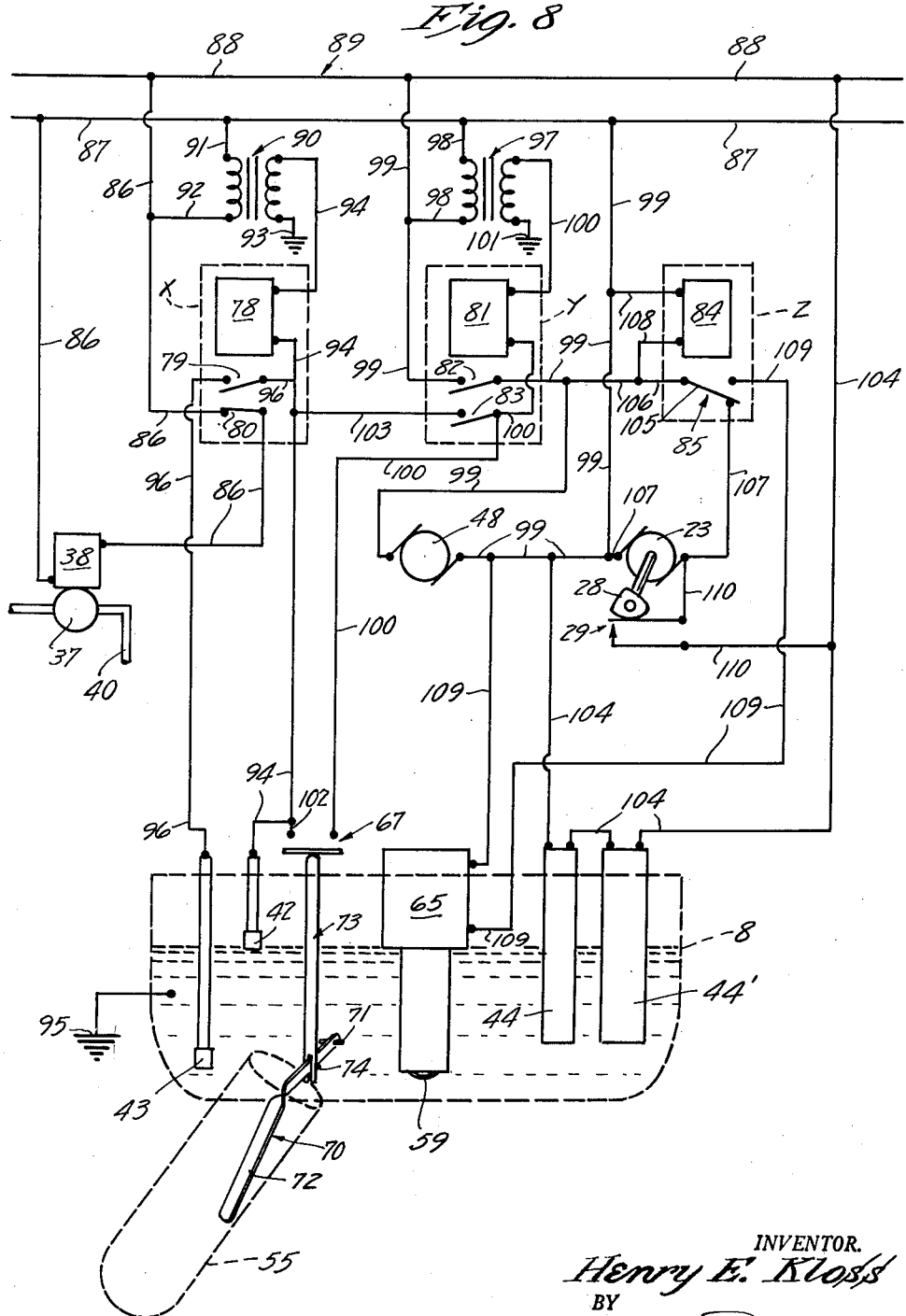
FIG. 8 is a wiring diagram.

In the preferred embodiment of the invention illustrated, the numeral 1 indicates, in its entirety, a base member formed to provide a generally cylindrical upright wall 2 which defines a reservoir 3 for the reception of finely divided granular food, such as powdered milk replace food or the like. The base member 1 is preferably made from cast metal, and is formed with a pair of generally vertically disposed laterally outwardly extending mounting flanges of the like 4, by means of which the base member 1 is secured to a wall or the like 5, through the medium of screws or the like 6, see FIG. 6. The reservoir 3 has an open top normally closed by a cover or lid 7. A bowl-like receptacle 8 is rigidly but detachably secured to the bottom portion of the base member 1 and defines therewith a mixing chamber 9 which communicates with the reservoir by means of an inlet passage 10 extending through the base member 1, see particularly FIGS. 2 and 6.

A vertically disposed shaft 11 is mounted for rotation in the bottom wall 12 of the reservoir 3, and has mounted on its upper end portion, for common rotation therewith, a dispenser rotor 13 comprising a felt base portion 14 and a metallic covering 15 therefor. As shown in FIGS. 2, 6, and 7, the dispenser rotor 13 defines a plurality of radially outwardly opening notches or recesses 16 which are adapted to move into and out of registration with the inlet passage 10 upon rotation of the rotor 15. A sloping baffle plate or shield 17 is mounted in the reservoir 3 in an overlying relationship to the passage 10 and the portion of the rotor 13 immediately adjacent the passage 10. The shield or baffle 17 is formed to provide depending skirts 18, the lower edges of which have but operating clearance with the top surface of the feeding or dispensing rotor 13. Obviously, granular dry food, indicated at A in FIG. 2, will flow by gravity into the notches or recesses 16 while said notches are uncovered by the baffle 17. As the dispensing rotor 13 rotates, one of the notches 16 filled with the dry granular food A moves under the baffle 17 and into registration with the passage 10, whereupon the material in said notch will fall by gravity through the passage 10 and into the mixing chamber 9. The depending skirt portions 18 of the baffle 17 prevent escape of granular food overlying the baffle or shield 17, and insure feeding of the granular food A to the mixing chamber 9 in the required amounts. As shown in FIG. 2, the shield or baffle 17 is secured to the wall portion 2 of the reservoir 3 by machine screws or the like 19, the shield 17 being further provided with a perforated ear 20 that journals a stud 21 extending axially upwardly from the shaft 11. A spring washer equipped nut 22 screw threaded on the stud 21 above the ear 20 maintains the lower edges of skirts 18 at proper running clearance with respect to the top surface of the dispensing rotor 13.

The dispensing rotor 13 is driven by an electric motor 23 through speed reduction gearing not shown but contained in a housing 24 rigidly secured to a mounting plate 25. The output shaft 26 of the speed reduction gearing is contained in an axial bore in the shaft 11 and is rigidly secured to the shaft 11 by a set screw or the like 27, see FIG. 2. The rotary shaft 11 is provided with a timing cam 28 which operates an electrical switch 29 mounted on the mounting plate 25. The plate 25 is provided with a plurality of circumferentially extended clots 30, through each of which extends one of a plurality of mounting screws 31 that are screw threaded into the base member 1. This mounting arrangement provides for timing adjustment between the cam 28 and its cooperating cam operated electrical switch 29.

Liquid, such as water, is fed from a suitable source of supply, not shown, by means of a conduit 32 connected at its delivery end to the inlet portion 33 of a conventional adjustable pressure regulating valve 34. An adjustable metering valve 35 is connected to the outlet portion 34' of the pressure regulating valve 34, and cooperates therewith to control the rate of flow of water to the mixing chamber 9. A suitable fitting 36 connects the metering valve to a shut off valve 37 that is controlled by a solenoid 38. With reference to FIG. 1, it will be seen that the valves 34, 35, and 37 are contained within a housing 39 carried by the base member 1, and that a relatively short conduit 40 extends downwardly from the solenoid operated valve 37 to the interior of the liquid mixing chamber 9. With reference to FIG. 4 it will be seen that a filter screen 41 is interposed between the delivery end of the conduit 32 and the inlet passage 33 of the pressure regulator valve 34. As will be hereinafter more fully described, the amount of liquid, indicated at B, delivered to the chamber 9 and discharged therefrom is controlled by a pair of electrode type control elements 42 and 43.

For the purpose of heating the water B in the chamber 9, and maintaining the water at a predetermined temperature for feeding, I provide a conventional electrical resistance heating element 44 of the submersion type, and a thermostat 44'. Inasmuch as the heating element 44 and the thermostat 44' do not in themselves comprise the instant invention, the same are only in diagrammatically shown, in the interest of brevity.

When a charge of dry food A is dispensed to the water B in the mixing chamber from the reservoir 3, it is highly desirable that the dry food A be thoroughly mixed or dissolved in the water B before being fed to a suckling animal, such as a calf, sheep, pig or the like. For the sake of convenience the suckling animal will be hereinafter referred to as calf. To insure a proper mixing or dissolving of the dry food A with the water B, I provide an agitator comprising a pair of cooperating agitator blades 45 that are mounted on the lower end portion of an agitator shaft 46 that is journaled in a pair of aligned vertically spaced bearings 47 mounted in the base member 1, see FIG. 2. With reference to FIGS. 1 and 2, it will be seen that the agitator shaft 46 is driven by a motor 48 through connections including an endless drive belt 49 entrained over a pulley 50 mounted fast on the drive shaft 51 of the motor 48 and another pulley 52 fast on the upper end of the agitator shaft 46.

The base member 1 defines an outlet passage 53 which terminates at one end adjacent an opening 54 in the bottom portion of the mixing chamber defining receptacle 8. A hollow collapsible resilient bulbous suckling nipple 55 extends angularly downwardly and outwardly from the opening 54 of the receptacle 8, and is provided at its outer end with a relatively small feeding aperture 56. The nipple 55 is secured to the receptacle 8 and adjacent portion of the base member 1 in communication with the outlet passage 53 by a flanged bushing 57 screw threaded into the adjacent end of the outlet 53, see FIGS. 2 and 3. For the purpose of preventing flow of liquid from the chamber 9 to the feeding nipple 55 except on demand of a calf, I provide a check valve 58 comprising a ball valve element 59 gravity seated on a valve seat 60 defined by the inner end of the outlet 53, see FIGS. 2 and 3. When the machine of the instant invention is in readiness to feed a calf, the valve ball element 59 is unseated from the valve seat 60 by the pressure differential between the mixing chamber 9 and the interior of the nipple 55, the interior of the nipple 55 being subjected to subatmospheric pressure generated by a calf sucking the nipple 55.

The check valve 58 is, in effect, a discharge valve for the mixing chamber 9 and must be rendered inoperative to permit discharge of the liquid mixture from the receptacle 9 until the machine is in readiness for feeding. For releasably locking the ball valve element 59 against valve opening movement away from the valve seat 60, I provide a plunger 61 having a rubber-like head 62 at its lower end engageable with the ball valve element 59. The plunger element 61 is preferably made from ferrous metal, and is mounted for vertical sliding movements in a tubular mounting element 63 that is screw threaded into the base member 1. See FIGS. 2 and 3. A coil compression spring 64 is interposed between the head 62 of the plunger rod 61 and a shoulder portion of the mounting member 63 axially upwardly spaced therefrom, and yieldingly urges the plunger rod 61 in a downward direction with sufficient force to hold the ball element 59 in sealing engagement with the valve seat 60 against the subatmospheric pressure generated in the interior of the nipple 55 by the calf. In order to permit opening of the check valve 58, when the machine is in readiness for feeding, I provide a solenoid coil 65 which encompasses the upper end portion of the tubular mounting member 63, and which is operative to raise the plunger rod 61 against bias of the spring 64. With reference to FIGS. 2 and 3, it will be seen that the solenoid winding 65 is disposed partially below the normal level of liquid B in the chamber 9 and that the solenoid winding 65 is contained within a well 66 defined by the base member 1. The tubular mounting member 63 is closed at its upper end, and the connection between the mounting member 63 and the base member 1 at the bottom of the well 66 is sealed by a suitable washer or gasket 67 to prevent leakage of the water or mixture outwardly therebetween. The plunger rod or element 61, being of ferrous metal, operates as an armature of the solenoid when the winding 65 is energized.

For the purpose of initiating an operative cycle of the machine to produce a liquid food mixture upon demand of the calf, I provide a normally open control switch 67 mounted on the base member 1, and having a control button 68 which is received in an enlarged recess 69 in the base member 1. For operating the control switch 67, I provide an actuator lever 70 that is pivotally connected at one end to the base member 1 within the outlet passage 53, as indicated at 71. An extended arm portion 72 of the lever 70 extends longitudinally into the interior of the nipple 55 adjacent the inner wall surface thereof, see particularly FIG. 2. A push rod 73 is pivotally connected at its lower end to the actuator lever 70, as indicated at 74, and extends upwardly through a passage 75 opening at its opposite ends into the outlet 53 and the switch button receiving recess 69. The upper end of the push rod 73 has operative engagement with the switch button 68 and operates to close the switch 67 when the nipple 55 is received in the mouth of a calf desiring to feed, and moved from its full line position of FIG. 2 to the dotted line position thereof. A flexible sealing member 76 is interposed between the upper end of the push rod 73 and the switch 67 to seal the switch 67 against moisture which may be present in the passage 75 and recess 69, and to prevent leakage of air into the outlet 53. For ease of assembly, the push rod 73 is preferably made in upper and lower sections 73a and 73b, said sections being screwed together as indicated at 77.

Operation of the machine to cause delivery of a predetermined amount of water to the chamber 9, a charge of dry food A to be also delivered to the mixing chamber 9, agitation and mixing of the dry food with the liquid, and the delivery thereof to the feeding nipple 55 is controlled by circuit means and apparatus now to be described, together with the switches 29 and 67. A control relay X comprises a relay winding 78 which when energized, causes closing of a normally open switch 79 and opening of a normally closed switch 80. A second control relay Y includes a winding or coil 81 which, when energized, causes closing of a pair of normally open switches 82 and 83. The control means further includes a time delay relay Z which comprises a winding 84 and a two-position switch 85. The time delay relay Z is of a type commonly used, the coil 84 thereof becoming energized after a predetermined time interval to operate the switch 85 thereof.

The normally closed switch 80 of the control relay X is interposed in series with the inlet valve colenoid 38 in a power lead 86 which has its opposite ends connected each to a different one of a pair of conductors 87 and 88 of a power line 89. The winding 78 of the control relay X is adapted to be energized by a transformer 90, the primary winding of which is connected to the power line 89 by a lead 91 connected to the conductor 87 and a second lead 92 connected to the conductor 88 by means of a portion of the lead 86. The low voltage secondary winding of the transformer 90 is grounded as indicated at 93, the relay winding 78 being interposed in a lead 94 connected at one end to the opposite end of the secondary winding of the transformer 90, and at its other end to the high level liquid control electrode 42. The ground connection 93 is preferably made to the metallic base member 1, and the low voltage control circuit is completed through the relay winding 78 when the water level reaches the electrode 42 to cause grounding therebetween and the base member 1 through the liquid B and as indicated at 95 in FIG. 8. A holding circuit for the winding 78 of the control relay X comprises the secondary winding of the transformer 90, the normally open switch 79 and a lead 96 connected at one end to the lead 94 between the relay winding 78 and the electrode 42, and at its other end to the electrode 43 which is grounded as indicated at 95 through the medium of the water B in the receptacle 8. With the above described arrangement, when the relay X is energized, by grounding of the electrode 42, the switch 80 is opened to shut off the supply of water to the receptacle 8, and the switch 79 is closed to hold the relay X energized until the liquid level in the chamber 9 drops below the electrode 43. Thus, once the valve 37 is closed by deenergization of the solenoid 38 therefor, delivery of water to the mixing chamber 9 will not be reinitiated until the liquid level drops below the electrode 43.

When the water has been fed to the mixing chamber 9, as above described, and the relay X has been energized to shut off the flow of water through the valve 37, the machine is in readiness for feeding a calf. The second relay Y is interposed in a circuit including the secondary winding of a transformer 97, the primary winding of which is interposed in a lead 98 connected at one end to the power conductor 87 and at its other end to the opposite power conductor 88. The circuit for relay winding 81 includes a lead 100 that is grounded at one end, as indicated at 101, the secondary winding of the transformer 97, and relay coil 81, the other end of the lead 100 being connected to one side of the control switch 67. The opposite side of the control switch 67 is connected to the lead 94 between the winding 78 of the relay X, and the electrode 42, as indicated at 102. Thus, assuming that the liquid in the chamber 9 is at its high level to ground the electrode 42, closing of the switch 67 by manipulation of the nipple 55, will cause the winding 81 of the relay Y to be energized. One side of the switch 83 of the relay Y is connected to the lead 99 intermediate the winding 81 and the switch 67, the other side of the switch 83 being connected to the electrode 42 by a lead 103 and a portion of the lead 94. It will be further noted that the relay Y will be held energized through its holding switch 83, the lead 103, part of lead 94, lead 96 and its closed switch 79, and electrode 43. With this arrangement, once the relay Y has been initially energized, the same will be held energized to maintain the valve 37 in a closed condition, until the liquid in the chamber 9 drops below the level of the electrode 43. Thus, in the event that the feeding calf releases the nipple 55 for a period of time, before liquid has dropped to its low level, and thereafter returns to feed again, no new supply of water will be added to the mixing chamber 9 until the calf has depleted the quantity remaining in the chamber from the previous mixed supply. The power lead 99, being connected at one end to the conductor 88, comprises a power circuit for the agitator motor 48, the switch 82 of the relay Y being interposed therein, the other end of the lead 99 being connected to the power conductor 87. Hence, as soon as the control switch 67 is closed to energize relay Y, the agitator motor 48 will be caused to operate, until the liquid in the mixing chamber 9 drops below the level of the electrode 43. A power circuit for the heater 44 and thermostat 44' comprises a power lead 104 in which the heater and thermostat are serially interposed. The lead 104 is connected at one end to the power conductor 88, and at its other end to the power lead 99 between its connection to the agitator motor 48 and the power conductor 87. Thus, the heater and thermostat are operative to control temperature of the liquid in the mixing chamber 9 during both idle and operative periods.

The switch 85 of the time delay relay Z comprises a movable switch element 105 that is connected to one end of a lead 106, the other end of which is connected to the lead 99 between the switch 82 and agitator motor 48. In a deenergized condition of the relay Z the movable switch element 105 makes connection with one end of a lead 107 in which is interposed the dispensing motor 23. The other end of the lead 107 is connected to the power lead 99 between the agitator motor 48 and the power conductor 87. The winding 84 of the time delay relay Z is interposed in a lead 108 that is connected at one end to the lead 106 and at its other end to the lead 99 between the agitator motor 48 and the power conductor 87. Due to the fact that the time delay relay Z is of the type which requires a predetermined time interval between completion of the circuit therethrough by the closing of the switch 82, and energization thereof, closing of the switch 82 will initiate operation of both the agitator motor 48 and dispenser motor 23 simultaneously. The time delay relay Z is preferably set to become energized approximately 10 to 12 seconds aftert he circuit therefor is closed. During this interval a charge of granular food A is discharged to the mixing chamber 9 and thoroughly mixed with the water therein. The valve releasing solenoid winding 65 is interposed in a lead 109 which has one end adapted to be contacted by the movable switch element 105 upon energization of the winding 84 of the time delay relay Z, and which has its other end connected to the power lead 99 between the agitator motor 48 and the power conductor 87. As soon as the solenoid winding 65 is energized, the subatmospheric pressure within the nipple 55 will cause the ball valve element 59 to become unseated from its cooperating valve seat 60, and the mixed water and food will flow through the outlet 53 and into the nipple 55.

The cut off switch 29 and switch operating cam 28 therefor cooperate to maintain the dispenser motor 23 operative after the switch element 105 has cut off the circuit to the motor 23. The switch 29 is interposed in a lead 110 that is connected at one end to the power lead 104 between its connection to the conductor 88 and the thermostat 44', and at its other end to the dispenser motor 23 opposite its connection to the lead 99 via the relatively short lead 107. Preferably, the switch 29 is closed by the cam 28 prior to breaking of the circuit to the dispenser motor 23 by the switch 85, the cam 28 holding the switch 29 closed until a filled notch or recess 16 of the dispenser rotor 13 becomes positioned closed adjacent the dry food passage 10, so that, on a subsequent cycle of operation, a charge of granular food A is fed to the mixing chamber almost immediately after energization of the dispensing motor 23 and agitator motor 48. Inasmuch as the agitator motor 48, time delay relay 84, and valve releasing solenoid coil 65 are dependent for operation upon energization of the relay Y to close the switch 82, de-energization of the Y caused by lowering of the liquid level below the bottom of the electrode 43 will render the relay Y, agitator motor 48, time delay relay Z and valve releasing solenoid 65 inoperative until the liquid level again reaches that of the electrode 42.

*Operation*

Assuming that the mixing chamber 9 is empty, and that the conduit 32 is connected to a source of supply of water, connecting the machine to a source of electrical power will cause the heating element 44 to become operative and the valve 37 to open to admit water to the mixing chamber 9 under constant pressure determined by the pressure regulator valve 34 and at a rate determined by the setting of the metering valve 35. Preferably, the metering valve 35 is set to admit water to the chamber 9 at a rate which will cause the mixing chamber to be filled to the level of the electrode 42 in approximately 35 to 45 minutes. Obviously, the metering valve 35 may be adjusted to vary this time interval according to calf feeding requirements. As soon as the water B reaches level of the electrode 42, the relay X becomes energized to shut off the water supply to the mixing chamber 9 and renders the machine operative responsive to the demands of a calf at the nipple 55. When a hungry calf begins to suck the nipple 55, the actuator lever 70 will be moved in a direction to close the switch 67 to energize the relay Y and initiate operation of the dispenser motor 23 and agitator motor 48. It has been found that a hungry calf will continue to suck the nipple for a length of time substantially greater than that required to thoroughly mix the dry food A with the water B in the mixing chamber, such required time normally being 10 or 12 seconds. Thereafter, the time delay Z operates to permit opening of the check valve 58 and feeding by gravity of the mixed liquid food through the outlet 53 to the nipple 55. As above described, the dispenser motor will operate until the switch 29 becomes open, and the agitator motor 48 will continue to operate until the level of the liquid is lowered beyond the electrode 43, at which time the agitator motor 48 will be de-energized by opening of the switches 79 and 83, and the check valve 58 will be held closed by the compression spring 64 associated therewith. This holding of the valve 58 is a closed condition after the mixing chamber has been substantially emptied, prevents a still hungry animal from obtaining liquid from the nipple 55 during the filling of the chamber with water until the subsequent feeding period, said subsequent period being determined by the time interval required for the water level to reach the upper electrode 42.

*Description of Modified Form Illustrated in FIGS. 9–11*

With reference particularly to FIGS. 9 and 10, it will be seen that a base member 1', substantially identical to the base member 1, is formed to provide a generally cylindrical upright wall 2' which defines a reservoir 3' for reception of the granular wall A. The reservoir 3' has its open upper end normally closed by a lid 7', and is adapted to be secured to the wall 5' in the same manner as the base member 1. A receptacle 8' rigidly secured to the base member 1' defines the mixing chamber 9' underlying an inlet passage 10' to the reservoir 3'.

The dispensing rotor mounted in the bottom of the reservoir 3', together with the means for operating the same, is identical to the corresponding structure of FIG. 2, and the parts thereof are indicated by like reference numerals as the corresponding part of FIG. 2, with prime marks added. Likewise, the agitator and driving means therefor, the discharge valve and control mechanism therefor, and the feeding nipple, of FIG. 9, are identical to those of FIG. 2 and are identified by corresponding reference numerals with prime marks added.

Contained within the reservoir 3' is a vertically extended semi-cylindrical baffle plate 111 having side flanges 112 that are rigidly secured to the reservoir wall 2' by rivets or the like 113. The baffle 111 defines a discharge compartment 114 which overlies the inlet passage 10' and the portion of the rotor 13 immediately adjacent the passage 10', the lower end of the baffle 111 being upwardly spaced from the top surface of the rotor 13 only sufficiently to provide running clearance therebetween. A leading face portion of the baffle 111, indicated at 115, facing in a direction generally opposite to that of rotary movement of the dispenser rotor 13', is provided with a notch 116 that is adapted to be partially or wholly covered by a metering plate 117 mounted on the leading face 115 of the baffle 111 for vertical adjustment with respect thereto. A wing nut equipped stud 118 extends outwardly from the leading face 115 of the baffle 111 through a slot 119 in the metering plate 117 for releasably locking the metering plate 117 in desired set position. Vertical adjustment of the metering plate 117 provides for a variation in the proportion of dry food A to the liquid B in the mixing chamber 9'. Preferably, the lid 7' is of a loose fitting type, so that the compartment 114 provides a ventilating passage for the mixing chamber 9'. If a greater amount of ventilation is desired, the lid 7' may be provided with louvers or other ventilating openings not shown.

It will be noted, with reference to FIG. 9, that the conduit 32' is connected directly to the valve 35' for delivery of water to the mixing chamber 9' through the shut-off valve 37', see FIG. 11, controlled by the solenoid 38'. In this embodiment of my invention, I dispense with pressure regulating valve 34. It will be further noted that means for heating of the liquid B in the mixing chamber 9 comprises a conventional cartridge type heating element 120 that is suitably mounted on the lower end of the base member 1' adjacent the bottom of the mixing chamber 9'.

As will now be described in detail, the control system for the device of FIGS. 9–11, and the operation thereof, differs from that of the form of the device illustrated in FIGS. 1–8. For example, the nipple 55' is devoid of the actuator lever 70, and the switch operating push rod 73 is absent. Mounted in the enlarged recess 69' in the base member 1' is a normally open fluid pressure operated switch 121 that is adapted to be closed by an increase in pressure within the nipple 55' and outlet passage 53', above atmospheric pressure, such increase in pressure being generated by squeezing of the nipple 55', which occurs when the suckling animal bites thereon. With reference to FIGS. 9–11, it will be seen that the switch 121 is operated by a spring biased pressure responsive actuator 121a. Thus the switch 121 comprises the control element which is operatively associated with the nipple 55' through the intervening air column in the passage 53' and in the interior of the nipple 55'. The control switch 121 is interposed in an electric circuit, in series with the agitator motor 48', said circuit comprising a lead 122 the opposite ends of which are connected each to a different one of a pair of conductors 87' and 88' of the power line 89'. The arrangement is such that the agitator motor 48' will be momentarily energized independently of other operating components of the device whenever the nipple 55' is squeezed to generate increased pressure within the outlet passage 53'. A control relay 123 comprises a relay winding 124 which, when energized, causes opening of a normally closed switch 125, and closing of a pair of normally open switches 126 and 127. The switch 125 is interposed in series with the solenoid 38', in a lead 128 which has its opposite ends each connected to a different one above the conductors 87 and 88. The winding 124 of the relay 123 is adapted to be energized by a transformer 90', the primary winding of which is connected to the power line 89' by a pair of leads 129. The low voltage secondary winding of the transformer 90' is grounded as indicated at 93', the relay winding 124 being interposed in a lead 130 connected at one end to the opposite end of the secondary winding of the transformer 90' and at its other end to a high level liquid control electrode 42' identical to the electrode 42 of FIGS. 1–8 inclusive. The circuit is completed through the winding 124 by grounding through the liquid B in the mixing chamber 9', as indicated at 95'. The switch 127 is adapted to close a holding circuit for the relay coil 124 in the same manner as the switch 79 of FIG. 8, said switch 127 being interposed in a lead 131 connected at one end to the low level electrode 43' and at its opposite end to the lead 130 intermediate the relay coil 124 and the high level electrode 42'.

The switch 126 controls operation of an agitator control relay 132 comprising a relay coil 133 and a normally open switch 134, and a time delay relay 135 comprising a relay coil 136 and a two-position switch 137. The switch 126 and relay coil 136 are serially connected in a circuit comprising, a portion of the lead 128 connected to the power conductor 88, and a lead 138 connected to the power conductor 87. The relay coil 133 is interposed in a circuit generally parallel to that of the coil 136, this circuit comprising a portion of leads 128 and 138, the switches 126 and 137, and a lead 139, the switch 137 in one position thereof being interposed in said lead 139. The switches 126 and 137 further cooperated to initiate operation of the dry food dispensing motor 23', said dispensing motor being interposed in a lead 140 that is connected at spaced points into the lead 139 in parallel with the relay coil 133. A holding circuit for the motor 23 comprises portions of leads 139 and 140, a lead 141 in which is interposed a cam operated switch 29', a portion of lead 138, the switch 126 interposed therein, and a portion of lead 128. The agitator motor 48' is energized independently of the fluid pressure operated switch 121 by closing of the switch 134 which is interposed in a lead 142 connected at one end to the lead 140 between its connection to the dispensing motor 23' and the power conductor 87, and at its other end to the motor 48'. The discharge valve solenoid 65' is controlled by the switches 126 and 137, said solenoid being interposed in a lead 143 that is connected at one end to the lead 138 between the relay coil 136 and the power conductor 87 and at the other end to the switch 137.

Operation of the device of FIGS. 9–11 differs from that of FIGS. 1–8 in that, when the liquid in the mixing chamber 9' reaches the level of the electrode 42', the dry food dispenser motor 23' is energized immediately to cause delivery of dry food to the mixing chamber 9'. Simultaneously, the relay coil 133 is energized to close the switch 134 to initiate operation of the agitator motor 48'. The time delay relay 135 is of the type which will delay energization of the coil 136 thereof for a predetermined time interval after electrical energy is applied thereto. In the present instance, the switch 137 will be positioned to hold the relay coil 133 and the dispensing motor 23' energized until the cam 28' closes the switch 29' to establish the holding circuit for the motor 23' and relay coil 133. Then, when the relay coil 136 becomes energized after the predetermined time delay, the circuit to the solenoid 65 becomes closed, and the mixture in the bowl 8' is in readiness to be consumed. Re-opening of the cam closed switch 29' de-energizes the feeding motor 23' and the relay coil 133 to de-energize the agitator motor 48'. At any time thereafter, when a suckling animal bites on the nipple 55', the switch 121 will be closed to re-energize the agitator motor 48' independently of the switch 134 and the mixture will be thoroughly stirred and blended just prior to and during consumption of the same. It will be noted that the time delay relay 135 will be energized until the level of the liquid mixture falls below and breaks contact with the electrode 43'. With this arrangement, the dry food dispensing motor 23 cannot be re-energized to deliver a subsequent charge of dry food to the mixing chamber 9 until substantially all of the previously mixed charge has been dispensed through the nipple 55'. Further, once the mixing bowl 8' has been refilled to the predetermined level, after which the dry food is immediately dispensed and mixed with the liquid, the time interval during which the calf or other suckling animal sucks on the nipple 55' prior to delivery of mixed liquid food thereto, is held to a minimum, such minimum being determined by the time setting of the time delay relay 135.

Mixer and Feeder of FIGS. 12 and 13

In this form of my present invention, the base member 1'' defines a discharge passage 143 between the outlet check valve 58'' and the nipple 55'', said passage 143 being devoid of communication with control elements such as the actuator lever 70 or the pressure operated switch 121. Otherwise, the mechanical components of this form of the invention are identical to corresponding ones described in connection with the form of the invention illustrated in FIGS. 1–11, and are identified by corresponding reference characters with double prime marks added.

The control system illustrated in FIG. 13 involves a single control relay 144 and a time delay relay 145, the control relay 144 comprising, a coil or winding 146, a normally closed switch 147 and a pair of normally open switches 148 and 149, the time delay relay comprising a coil or winding 150 and a double-throw or two-position switch 151. The switch 147 is interposed in series with the solenoid 38'' in a lead 152 the opposite ends of which are each connected to a different one of a pair of conductors 87 and 88 of the power line 89. The coil 146 of the relay 144 is powered by a transformer 90'', the primary winding of which is interposed in a lead 153 connected to the power conductor 88 through a portion of the lead 152, and to the power conductor 87. The low voltage secondary winding of the transformer 90'' is grounded at one end as indicated at 93'', the other end of the secondary winding being connected to one end of a lead 154 having its other end connected to the electrode element 42', the relay coil 146 being interposed in said lead 154. The switch 148 is interposed in a lead 155, one end of which is connected to the lead 154 between the coil 146 and electrode element 42'', the other end of the lead 155 being connected to the electrode element 43'', the electrode element 43'', lead 155, and switch 148 providing a holding circuit for the relay coil 146. The energizing and holding circuits for the coil 146 are completed, through the medium of liquid in the mixing bowl 8'', to ground as indicated at 95''.

The coil or winding 150 of the time delay relay 145 is energized through closing of the switch 149, said switch and relay coil being interposed in series in a lead 156 which is connected at one end to the power conductor 87 and at its other end to the power conductor 88 through a portion of the lead 152. The switch 149 further controls operation of the agitator motor 48'', which is interposed in a lead 157 that is connected at one end to the lead 156 between the switch 149 and the relay coil 150, and at its other end to the lead 156 between the coil 150 and the power conductor 87. With this arrangement, the agitator motor 48'' continues to operate from the time that the liquid level in the mixing bowl 8'' has reached the electrode element 42'' until said level falls below that of the electrode element 43''. The dry food dispensing motor 23'' is connected in a primary circuit including a lead 158 that is connected at one end to the lead 157 and at its other end to one side of the two-position switch 151; and a holding circuit including the cam operated switch 29'' which is interposed in a lead 159 that is connected to the lead 158 between the motor 23'' and the switch 151, and at its other end to the power conductor 88. Energization of the time delay coil 150, which occurs after a predetermined time interval subsequent to energization of the relay coil 146 to permit starting of the dispensing motor 23'' and closing of the holding switch 29'', causes the switch 151 to be moved to its other or second position to energize the solenoid 65'' to release the discharge valve 59''. The solenoid 65'' is interposed in a lead 160 that is connected at one end to the lead 157 and at its other end to the opposite side of the two-position switch 151. The heating element 120'' and its cooperating thermostat 44'' operate independently of the other components of the control system, said heating element and thermostat being connected in series in a lead 161 that is connected at one end to the power conductor 87 through the medium of a portion of the lead 157 and a portion of lead 156, and at its other end to the power conductor 88 through the medium of a portion of lead 159.

With the arrangement above described in connection with FIGS. 12 and 13, when the level of liquid fed to the mixing bowl 8'' through the conduit 32'', reaches the level of the electrode element 42'', the relay 144 will be energized to shut off the flow of liquid through the conduit 32'' to the mixing bowl 8''. Simultaneously, the motors 23'' and 48'' are energized to initiate operation of the dry food dispensing mechanism and of the agitator 45''. After a suitable time intervals, the switch 151 of the time delay relay 145 is operated to close the circuit to the solenoid 65'' thus releasing the discharge valve 59'', whereupon the mixed material flows into the nipple 55'' for immediate delivery upon demand. The dry food dispensing motor 23'' continues to operate until the holding circuit therefor, through the switch 29'' is opened by the cam 28'', at which time the motor 23'' will be de-energized. The agitator motor 48'' will continue to operate until the level of the liquid in the mixing bowl 8'' drops below the electrode element 43'', whereupon the holding circuit for the relay winding 146 is broken, de-energizing the relay 144 and opening the switch 149, thereby opening the circuit to the motor 48''.

Control System of FIG. 14

The form of the invention shown diagrammatically in FIG. 14 utilized substantially all of the mechanical components and all of the electrical control elements above described in connection with the form of the invention illustrated in FIGS. 1–8. Hence, those components and elements of FIG. 14 which are identical to those of FIG. 8 are indicated with like reference numerals. It will be noted however, that I have substituted the heating element 120 of FIGURE 9 for the heating element 45, and that I have added a normally open switch 162 that is controlled by the switch actuator lever 70 simultaneously with the switch 67. It will be further noted that the control system of FIG. 14 further includes an additional relay 163 comprising a relay coil 164 and a normally open switch 165. The coil 164 of the relay 163 is interposed in the lead 107, so as to be connected in series with the dispenser motor 23. The switches 162 and 165 are connected in series in a lead 166 that is shunted across a portion of the lead 104, the lead 99 opposite its connection to the power conductor 87, being connected to the lead 166 intermediate the switches 162 and 165.

Addition of the relay 163 and switch 162, together with the change of connection of the agitator motor 48, above described, causes the machine of FIG. 14 to operate in a different manner from that of FIGS. 1–8. When liquid is delivered to the mixing bowl 8 to the extent that the level thereof rises to the electrode element 42, the coil 78 of the relay X becomes energized to shut off flow of liquid to the mixing bowl 8 by opening of the switch 80, closing of the switch 79 completing a holding circuit for the coil 78. The machine will then remain in a static condition until a calf or other animal, desiring to feed, manipulates the actuator lever 70 to cause closing of the switches 67 and 162. As hereinbefore described, closing of the switch 67 causes energization of the coil 81 of the relay Y to close the switches 82 and 83. Closing of the switch 83 establishes a holding circuit for the relay coil 81, and closing of the switch 82 causes a circuit to be completed to the time relay Z and energizes the relay coil 164 to close its switch 165 and energize the dispenser motor 23. Closing of the switch 162 by the actuator lever 70 causes an initiating circuit to be closed through the agitator motor 48, a holding circuit for the agitator motor 48 including the lead 99, a portion of lead 166, and a portion of lead 104. After a suitable time interval subsequent to closing of the circuit through the time delay relay coil 84, said coil 84 becomes energized to open the circuit to the relay coil 164 and close the circuit through the valve releasing solenoid 65 to permit liquid food to be discharged through the valve 59 to the nipple 55. It will here be noted that deenergization of the relay coil 164 causes opening of the switch 175 to deenergize the agitator motor 48. In the event that the animal stops feeding before the liquid level in the mixing bowl 8 drops to a point below the level of the electrode element 43, causing opening of the switches 67 and 162, the time delay relay coil 84 will be held energized by reason of continued energization of relay coils 78 and 81 through their holding circuits. However, the agitator motor 48 will cease to operate until the switch 162 is again closed when an animal again engages the nipple 55. Thus, the agitator motor 48 is prevented from operating except during actual feeding and, if the suckling animal does leave the nipple before substantially all of the mixed liquid food has been discharged from the bowl 8, undue frothing of the remaining liquid will not occur, as would otherwise be the case with a continuously operating agitator. Further, as long as the liquid mixture in the bowl is above the lowermost level of the electrode element 43, the time delay relay coil 84 will remain energized to prevent reenergization of the dry food dispenser motor 23, so that another charge of dry food will not be dispensed into the mixing bowl 8 until the same has been refilled with a fresh charge of liquid through the conduit 40.

*Animal Feeder of FIG. 15*

The modified form of my device illustrated somewhat diagrammatically in FIG. 15, as well as those shown in FIGS. 16–18, involve the same general concept as the several forms of the device illustrated in FIGS. 1–14. The devices above described, and shown in FIGS. 1–14 are intended primarily for use with a relatively small number of suckling animals, preferably not to exceed four. In the feeding of a single suckling animal, or a very small number thereof, it is preferred that the time interval between available feedings be of sufficient duration to prevent over-feeding. Obviously, as the number of animals, to which the device is made available, increases, the duration of the time interval between available feedings must be decreased, in order that each animal receives a normal or sufficient daily food ration. In practice, I have found that when a given device is used to feed from between twelve to twenty suckling animals, such as calves, the time interval between available feedings may be shortened to periods from approximately two to five minutes. It has been further found that when one calf has consumed a given quantity of the liquid food, such as is made available by a single cycle of operation of the device, the fed calf is easily pushed away from the feeding nipple by a hungry calf, who usually will, if sufficiently hungry, suckle on the nipple until food is again available at the nipple. Further, in the feeding of a larger number of animals from a single device, it is not necessary to mix a small batch of the liquid food for each feeding. In fact, a pre-mixed batch, sufficient for an entire day's feeding for all of the calves in a given group, may be placed in a suitable reservoir and made available therefrom in relatively small feeding quantities at predetermined time intervals.

In the modified form of the invention, illustrated in FIG. 15, a relatively large liquid food supply container 170 is shown being provided with a closure-equipped filler opening 171 through which the container 170 may be filled with a relatively large batch of pre-mixed liquid food. A discharge conduit 172 receives liquid from the container 170 and is provided at its lower discharge end with a feeding nipple 173, the conduit 172 having interposed therein a check valve 174 and a power operated valve 175. The valve 175 is normally open, and is operatively coupled to a solenoid 176 which, when energized, closes the valve 175. The solenoid 176 is interposed in a power circuit comprising a lead 177 in which also is interposed a normally open switch 178, the lead 177 at its opposite ends being connected to a suitable source of potential such as a two-conductor line 179.

The control valve 175 with its operating solenoid 176 provide a cyclic flow control device between the supply container 170 and the nipple 173. Operation of the solenoid 176 is controlled by actuator means including a switch arm 180 that is operatively connected for common movements with a float 181 in the container 170 and which is adapted to rise and fall with the level of the liquid food in the container 170. The switch arm 180 is connected to the lead 177 and is adapted to make electrical contact with each of a plurality of cooperating contact elements 182 in progression according to liquid level changes in the container 170. Each of the contact elements 182 is connected to a different one of a corresponding plurality of circumferentially spaced contact bars or the like 183, by means of respective ones of a plurality of leads 184. The contact bars 183 are engaged in progression by a wiper element 185 that is mounted on the outer end of a radial arm 186 the inner end of which is rigidly mounted on the shaft 187 of a timing motor or the like 188. The wiper element 185 is preferably insulated from the shaft 187 and has connected thereto one end of a lead 189 in which is interposed the timing motor 188, the opposite end of the lead 189 being connected to one of the power conductors 179. Also mounted on the timing motor shaft 187 is a switch operating cam 190 that is adapted to close the normally open switch 178 and alternately permit the switch 178 to open, at a number of times during a single revolution of the shaft 187 corresponding to the number of switch contact elements 182 and cooperating contact bars 183.

*Operation of Device of FIG. 15*

The arrangement of the switch arm 180 to its cooperating contact elements 182 is such that, when the container 170 is filled with liquid, the switch arm 180 is disposed in upwardly spaced relation to the uppermost switch contact element 182. At this point, it will be appreciated that the wiper element 185 is positioned in engagement with the contact bar 183 connected to the uppermost contact element 182, and the cam 190 is positioned relative to the switch 178 so that said switch is in an open condition. At this point, the motor 188 and solenoid 176 are deenergized, and liquid is available at the nipple 173.

As a calf suckles the nipple 173, the liquid is drawn from the container 170 through the open valve 175 and check valve 174, the check valve 174 operating to prevent return of the liquid toward the container 170 during squeezing of the nipple 173 by the feeding animal. As soon as the switch arm 180 descends into engagement with the uppermost contact element 82, the circuit through the timing motor 188 is closed, whereupon the motor 188 will rotate the shaft 187 and parts carried thereby to move the wiper element 185 progressively into operative engagement with the next successive contact bar 183 and out of engagement with the former contact bar 183, while at the same time the cam 190 closes the switch 178 and thereafter permits the same to open. The speed of rotation of the shaft 187 and parts carried thereby determines the length of time which the timing motor 188 is energized and the switch 178 closed. This time interval is determined by the operator and is governed by the number of animals to be fed by the device. During the time that the switch 178 is closed, the solenoid 176 is energized to close the valve 175, this time interval being anywhere between two and five minutes depending upon the number of animals to be fed. As soon as the timing motor 188 and solenoid 176 are deenergized, liquid is again available at the nipple, and will remain available until an animal consumes a predetermined amount of the liquid necessary to lower the level of the float to a point where the switch arm 180 makes electrical contact with the next lower contact element 182, thus causing the timing motor 188 to be reenergized to close off the supply of liquid and to set up the time cycle for the next subsequent feeding.

*Description of Modified Form of FIG. 16*

This modification of the invention involves a relatively large liquid food supply container 191 and a relatively small feeder tank or the like 192, the bottom portion of which is provided with a discharge conduit 193 that is provided with a check valve 194 similar to the check valve 174. A feeding nipple 195 is mounted on the discharge end of the conduit 193. A feeding conduit 196 conducts liquid from the large container 191 to the feeder tank 192, full of the liquid being controlled by a pump 197 that is driven by an electrically powered motor 198.

The pump motor 198 is interposed in a circuit comprising a power lead 199 the opposite ends of which are connected each to a different one of a pair of power conductors 200 and 201, and a normally open switch 202 and a normally closed switch 203 interposed in series in the lead 199. The normally open switch 202 is operated by a conventional time delay relay 204 that is powered through a lead 205 connected at one end to the power conductor 201 and at its other end to the lead 199, whereby the time delay relay 204 is disposed in a series circuit with the normally closed switch 203 and in a parallel circuit with the normally open switch 202 and motor 198. The switch 202 is closed by energization of the time delay relay 204, and the normally closed switch 203 is adapted to be opened by energization of a relay winding 206. The relay winding 206 is powered by a conventional transformer 207, the primary coil 208 of which is connected to the power conductors 200 and 201 by a lead 209 and part of the lead 199. The transformer 207 includes a secondary winding 210 one end of which is grounded, the other end being connected to one end of a lead 211 in which is interposed the relay winding 206. The other end of the lead 211 is connected to a high level electrode 212 within the feeder tank 192 and spaced from the walls thereof, the feeder tank 192 being grounded by means of a lead 213. A holding circuit for the relay winding 206 comprises a second electrode 214 which terminates near the bottom of the feeder tank 192, and a lead 215 connected at one end to the electrode 214 and at its other end to the lead 211 intermediate the relay winding 206 and the upper electrode 212. A normally open holding switch 216 is interposed in the lead 215, and is adapted to be closed by energization of the relay winding 206.

*Operation of Device of FIG. 16*

Assuming that the supply container 191 has been filled with a large volume supply of liquid and that the feeder tank 192 is empty, current flowing through a portion of the lead 199 and the closed switch 203 to the time delay relay 204 will cause the normally open switch 202 to be closed after a predetermined lapse of time for which the time delay relay 204 is set, preferably between two and five minutes. Upon closing of the switch 202, the motor 198 will be energized, causing liquid to be pumped from the supply container 191 to the feeder tank 192 until the liquid level in the feed tank 192 reaches that of the electrode 212. When this occurs, the circuit through the relay winding 206 will be closed, causing the switch 203 to be opened and the holding switch 216 to be closed. Opening of the switch 203 will open the circuit to the time delay relay 204 and to the pump motor 198, cutting off further delivery of liquid to the feeder tank 192. As soon as liquid is delivered to the feeder tank 192, it is available to a suckling animal, and it will be appreciated that delivery of the liquid to the feeder tank 192 by the pump 197 is at a much more rapid rate than that at which the animal can consume the liquid. Thus, at best, the animal can consume but a little more than which is normally contained in the feeder tank 192. During the time the suckling animal is depleting the supply from the feeder tank 192, the liquid level drops below the upper electrode 212, the circuit to the relay winding 206 being held through the lower electrode 214 and the holding switch 216. When the liquid level drops below the electrode 214, the relay winding 206 is deenergized to initiate a new cycle of operation continent on the time delay period governed by the time relay 204. Although it has been stated that the time relay period is preferably between two and five minutes, it should be understood that this delay may be of any desired time interval depending to an appreciable extent upon the number of animals to be fed from a given device.

*Description of Modification of FIG. 17*

In this form of the invention, liquid food is fed by gravity from a large volume supply in a container 217 to a feeding nipple 218 through a conduit 219, in which is interposed a check valve 220 and a power operated valve 221. The valve 221 is controlled by a solenoid 222 that is interposed in a lead 223 in which is also interposed a timing switch 224. The lead 223 is connected at its opposite ends to a conventional source of electrical potential such as a two-conductor line 225. The switch 224 is adapted to be alternately opened and closed at given time intervals by suitable means, such as a switch operating cam 226 that is operatively coupled to a timing motor 227. The motor 227 is disposed in a circuit containing a portion of the lead 223 and a second lead 228 one end of which is connected to the lead 223 and the opposite end of which is connected to one of the power conductors 225. Preferably, the switch operating cam 226 is rotated at a speed which will open and close the switch 224 in a manner to cause the solenoid operated valve 221 to be closed for a desired relatively long time interval and opened for a desired relatively short time interval. In practice, it has been found that a hungry animal will consume an adequate supply of the liquid in approximately 30 seconds, and the contemplated speed of rotation of the cam 226 is such that the valve 221 will be opened for a duration of approximately 30 seconds time. The interval during which the valve 221 is closed depends to an appreciable extent on the number of animals being fed by the device and, as above indicated, may be anywhere between two and five minutes in an installation where from approximately twelve to twenty animals are to be fed. Obviously, longer off-cycle periods are desirable when lesser numbers of animals are to be fed by a given device.

It will be noted that in the device of FIG. 17, the periods of availability and non-availability of liquid at the nipple 218 continue to occur whether or not animals are feeding from the nipple. With this arrangement, if a hungry animal begins to suckle the nipple 218 during an off-cycle interval, it is highly probable that the animal will continue to suckle until an on-cycle interval is initiated and continue suckling until the on-cycle interval is terminated. In the event that the animal begins to suckle toward the end portion of an on-cycle interval, whereby it receives only a partial ration of the liquid, the animal usually persists in suckling through the next off-cycle interval and into and through the following on-cycle interval, after which the animal is usually satisfied to the extent that it will leave the nipple voluntarily or permit itself to be pushed away from the nipple by another animal.

*Description of Feeder of FIG. 18*

In this modified form of the invention, a large volume liquid food supply container 229 is shown as being provided with a base portion 230 from which vertically extends an open topped measuring tube or the like 231. The measuring tube 231 is of a size to obtain a single feeding portion of the liquid, the lower end of the tube 231 communicating with a passage 232 in the base member 230, the passage 232 leading to a conduit 233 having interposed therein a check valve 234. A feeding nipple 235 is mounted to the discharge end of the conduit 233. The base member 230 defines a pump chamber 236 having an inlet 237 and an outlet 238 which communicates with a delivery tube or pipe 239 that extends upwardly from the base member 230 and is adapted to deliver the liquid food to the upper end of the measuring tube 231 from the pump chamber 236. A pump impeller 240 is disposed within the pump chamber 236 and is mounted on the shaft 241 of a motor 242 suitably mounted on the bottom surface of the base member 230.

The pump motor 242 is connected, in series with a normally open switch 243, in a circuit comprising a lead 244, the opposite ends of which are connected to opposite sides of a two-conductor power line 245. The switch 243 comprises a pair of movable switch arms 246 and 247 having cooperating contact elements 248 and 249 respectively thereon. A timing motor 250 drives a pair of cams 251 and 252 which engage respective ones of the switch arms 246 and 247 and which cooperate with yielding means in the nature of coil springs or the like 253 to cause opening and closing movements to be imparted to the switch arms 246 and 247. Intermediate their ends, the switch arms 246 and 247 are pivotally mounted, as indicated at 254, to suitable supporting means, not shown. The timing motor 250 is interposed in a lead 255, the opposite ends of which are connected to the power conductor lines 245. Preferably, the cams 251 and 252 are so arranged, and the timing motor 250 is driven at such speed, that the timing switch 243 will be alternately open for a time interval of relatively long duration and closed for a time interval of relatively short duration. The pump impeller 240 is capable of completely filling the measuring tube 231 in approximately eight seconds. Hence, this is all the time necessary for the switch 243 to be closed. The time interval during which the switch 243 is open depends on the number of animals to be fed, and may be regulated by changing the speed of the timing motor 250, or by any suitable means.

It will be noted that the pump motor 242 will be alternately energized and deenergized to drive the pump impeller 240 whether the measuring tube 231 is full or empty. Obviously, if the pump motor 242 is energized during a time when the measuring tube 231 is full, the liquid delivered from the pump will simply overflow the measuring tube 231 and return to the container 229 exterior of the measuring tube. Inasmuch as the pump is capable of filling the measuring tube 231 at a much more rapid rate than a suckling animal can empty the same through the nipple 235, an animal starting to suckle the nipple during the on-cycle of operation will receive little more than the quantity of liquid normally held by the measuring tube 231. In any event, this greater quantity will not be sufficient to cause an animal to be overfed at any one given feeding.

My invention has been thoroughly tested and found to be completely satisfactory for the accomplishment of the objectives set forth; and, while I have shown a commercial embodiment of my automatic milk food mixer and suckling animal feeder, and several modifications thereof, it will be understood that the same is capable of further modification without departure from the spirit and scope of the invention as defined in the claims.

What is claimed is:

1. In an automatic liquid food mixer and animal feeder; structure defining a reservoir for finely divided granular dry food and a mixing chamber having an outlet in its bottom portion; means for automatically delivering a predetermined quantity of liquid to said mixing chamber; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a discharge valve controlling discharge of material through said outlet; operating mechanism for said valve; and control means for said liquid delivery means, dispensing mechanism, agitator driving means and valve operating mechanism, said control means including an actuator operatively associated with said nipple and operative responsive to manipulation of said nipple to cause delivery of dry food to liquid in said chamber and mixing thereof by said agitator prior to discharge of the mixture through said outlet and feeding nipple.

2. In an automatic liquid food mixer and animal feeder; structure defining a reservoir for finely divided granular dry food and a mixing chamber having an outlet in its bottom portion; means including an inlet valve for delivery of liquid to said mixing chamber; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a discharge valve controlling discharge of material through said outlet; operating mechanism for said discharge valve; and control means for said liquid delivery means, dispensing mechanism, valve operating means and agitator driving means, and including an actuator operatively associated with said nipple and operative responsive to manipulation of said nipple to cause delivery of dry food to liquid in said mixing chamber and mixing thereof prior to discharge of the mixture through said outlet and nipple, said control means further including a device responsive to accumulation of liquid to a predetermined high level in said chamber to render the dispensing mechanism, discharge valve operating mechanism and agitator driving means operative; and responsive to a predetermined drop in liquid level to render said dispensing mechanism, discharge valve operating mechanism and agitator driving means in operative independently of said actuator.

3. In an automatic liquid food mixing and calf feeding machine; structure defining a reservoir for finely divided granular dry food and a mixing chamber having an outlet in its bottom portion; means including a metering valve for automatically delivering liquid to said mixing chamber at a predetermined slow rate during an idle period of the machine; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a discharge valve controlling discharge of material through said outlet; operating mechanism for said discharge valve; and control means for said liquid delivery means, dispensing mechanism, valve operating means and agitator driving means, and including an actuator operatively associated with said nipple and operative responsive to manipulation of said nipple to cause delivery of dry food to liquid in said mixing chamber and mixing thereof prior to discharge of the mixture through said nipple, said control means further including a device responsive to accumulation of liquid to a predetermined high level in said chamber to render the liquid delivery means inoperative and to render said dispensing mechanism and agitator driving means operative, said device being responsive to a predetermined drop in liquid level to render said dispensing mechanism and agitator driving means inoperative independently of said actuator, and to render said liquid delivery means operative.

4. In an automatic liquid food mixer and animal feeder; structure defining a reservoir for finely divided granular dry food and a mixing chamber having an outlet in its bottom portion; means for automatically delivering a predetermined quantity of liquid to said mixing chamber; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a check valve in said outlet operative to normally close said outlet and to open the same when predetermined subatmospheric pressure is introduced to the interior of said nipple; valve operating mechanism for releasably holding said check valve closed against said subatmospheric pressure; and control means for liquid delivery means, dispensing mechanism, agitator driving means and valve operating mechanism, and including an actuator operatively associated with said nipple and operative responsive to manipulation of said nipple to cause delivery of dry food to liquid in said chamber, mixing thereof by said agitator, and release of said check valve to permit opening thereof responsive to subatmospheric pressure in said nipple after a predetermined period of operation of said agitator.

5. The structure defined in claim 4 in which said control means includes a time delay device and connections therebetween and said valve operating mechanism for causing said check valve to be normally held closed for a predetermined time interval after initiation of operation of said dispensing mechanism and agitator driving means, and for causing release of said check valve upon termination of said time interval.

6. In an automatic liquid food mixer and animal feeder; structure defining a reservoir for finely divided granular dry food and a mixing chamber having an outlet in its bottom portion; means for automatically delivering a predetermined quantity of liquid to said mixing chamber; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a valve seat in said outlet; a check valve element normally engaging said seat and movable out of seating engagement therewith when predetermined subatmospheric pressure is introduced to the interior of said nipple; a member mounted for movement toward and away from said valve element and valve seat; yielding means urging said member in a direction to hold said valve element in seating engagement with said valve seat against said subatmospheric pressure; power operated means for moving said member in the opposite direction against bias of said yielding means; and control means for said liquid delivery means, dispensing mechanism, agitator driving means and said power operated means, and including an actuator operatively associated with said nipple and operative responsive to manipulation of said nipple to cause delivery of dry food to liquid in said chamber, mixing thereof by said agitator, and release of said check valve element by said member to permit opening of said check valve responsive to subatmospheric pressure in said nipple after a predetermined period of operation of said agitator.

7. The structure defined in claim 6 in which said power operated means comprises a solenoid winding, said valve element engaging member defining an armature cooperating with said solenoid winding to be moved thereby against bias of said yielding means.

8. In an automatic liquid food mixer and animal feeder; structure defining a reservoir for finely divided granular dry food and a mixing chamber having an outlet in its bottom portion; means for automatically delivering a predetermined quantity of liquid to said mixing chamber; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a discharge valve controlling discharge of material through said outlet; operating mechanism for said discharge valve; and control means including an actuator lever mounted in said outlet and having an arm extending generally longitudinally within said nipple; and connections therebetween and said liquid delivery means, dispensing mechanism, valve operating mechanism, and agitator driving means; manipulation of said nipple imparting movement to said lever in a direction to cause delivery of dry food to liquid in said mixing chamber and mixing thereof prior to discharge of the mixture through said feeding nipple.

9. In an automatic liquid food mixer and animal feeder; structure defining a reservoir for finely divided granular dry food and a mixing chamber having an outlet in its bottom portion; means including an inlet valve and electrical valve operating mechanism for automatically delivering a predetermined quantity of liquid to said mixing chamber; mechanism including a motor for dispensing a predetermined quantity of said dry food from said reservoir to the mixing chamber; an agitator in the mixing chamber; a motor for driving said agitator; a feeding nipple secured to said outlet and communicating with said mixing chamber; a discharge valve controlling discharge of material through said outlet; electrically controlled operating mechanism for said discharge valve; electrical power circuit means adapted to be connected to a source of electrical potential for said valve operating mechanisms and said motors; control circuit means including a switch for controlling operation of said valve operating mechanisms and said motors; and a switch actuator operatively associated with said nipple and operative responsive to manipulation of said nipple to cause delivery of dry food to liquid in said mixing chamber and mixing thereof prior to discharge of the mixture through said feeding nipple.

10. In an automatic liquid food mixer and animal feeder; structure defining a reservoir for finely divided granular dry food and a mixing chamber having an outlet in its bottom portion; means including an inlet valve for delivering liquid to said mixing chamber; power operated mechanism for opening and closing said inlet valve; power operated mechanism for dispensing a predetermined quantity of said dry food from the reservoir to the mixing chamber; an agitator in said mixing chamber; means for driving said agitator; a feeding nipple secured to said outlet and communicating with said mixing chamber; a discharge valve controlling discharge of material through said outlet; operating mechanism for said discharge valve; control means for said inlet and discharge valve operating mechanism, dispensing mechanism and agitator driving means and including an actuator operatively associated with said nipple and operative responsive to manipulation of said nipple to cause delivery of dry food to liquid in said mixing chamber and mixing thereof prior to discharge of the mixture through said outlet and nipple; said control means further including a liquid level responsive control device operatively coupled to said actuator to hold said inlet valve closed during discharge of said mixture, to cause opening of said inlet valve upon release of said nipple and actuator only when the mixture in said chamber reaches a predetermined low level, and to cause closing of said inlet valve when the liquid delivered to said chamber reaches a predetermined high level.

11. The structure defined in claim 10 in which said liquid delivery means includes a pressure regulating device and an adjustable metering valve for controlling the rate of flow of liquid to said chamber, whereby the time consumed in filling said chamber from said predetermined low level to said predetermined high level approximates the normal minimum time interval between calf feedings.

12. In an automatic liquid food mixer and animal feeder; structure defining a reservoir for finely divided granular dry food and a mixing chamber having an outlet in its bottom portion; means including an inlet valve for delivering liquid to said mixing chamber; electrical valve operating mechanism for said inlet valve; mechanism including a motor for dispensing a predetermined quantity of said dry food from said reservoir to the mixing chamber; an agitator in the mixing chamber; a motor for driving said agitator; a feeding nipple secured to said outlet and communicating with said mixing chamber; a discharge valve controlling discharge of material through said outlet; electrically controlled operating mechanism for said discharge valve; electrical power circuit means adapted to be connected to a source of electrical potential for said valve operating mechanisms and said motors; control circuit means including a switch for controlling operation of said valve operating mechanisms and said motors; and a switch actuator operatively associated with said nipple and operative responsive to manipulation of said nipple to cause delivery of dry food to liquid in said mixing chamber and mixing thereof prior to discharge of the mixture through said feeding nipple; said control means further including an electrical device responsive to acumulation of liquid to a predetermined high level in said chamber to render the dispensing mechanism discharge valve operating mechanism and agitator driving means operative, and responsive to a predetermined drop in liquid level to render said dispensing mechanism, discharge valve operating mechanism, and agitator driving means inoperative independently of said actuator.

13. In an automatic liquid food mixer and animal feeder; structure defining a reservoir for finely divided granular dry food and a mixing chamber having an outlet in its bottom portion; means for automatically delivering a predetermined quantity of liquid to said mixing chamber; means including a heating element and a cooperating control element therefor in said chamber for heating the liquid and maintaining the same at a predetermined temperature; power operated mechanism for dispensing a predetermined quantity of dry food from the reservoir to the mixing chamber; an agitator in said mixing chamber; means for driving said agitator; a feeding nipple secured to said outlet and communicating with said mixing chamber; a discharge valve controlling discharge of material to said outlet; operating mechanism for said valve; and control means for said liquid delivery means, dispensing mechanism, agitator driving means and valve operating mechanism; said control means including an actuator operatively associated with said nipple and operative responsive to manipulation of said nipple to cause delivery of dry food to liquid in said chamber and mixing thereof by said agitator prior to discharge of the mixture through said outlet and feeding nipple.

14. In an automatic liquid food mixer and animal feeder; structure defining a reservoir for finely divided granular dry food and a mixing chamber having an outlet in its bottom portion; means including an inlet valve and electrical valve operating mechanism for automatically delivering a predetermined quantity of liquid to said mixing chamber; means including an electrical heating element and a cooperating control element therefor in said chamber for heating the liquid and maintaining the same at a predetermined temperature; mechanism including a motor for dispensing a predetermined quantity of said dry food from said reservoir to the mixing chamber; an agitator in the mixing chamber; a motor for driving said agitator; a feeding nipple secured to said outlet and communicating with said mixing chamber; a discharge valve controlling discharge of material through said outlet; electrically controlled operating mechanism for said discharge valve; electrical power circuit means adapted to be connected to a source of electrical potential for said valve operating mechanisms and said motors; control circuit means including a switch for controlling operation of said valve operating mechanism and said motors; and a switch actuator operatively associated with said nipple and operative responsive to manipulation of said nipple to cause delivery of dry food to liquid in said mixing chamber and mixing thereof prior to discharge of the mixture through said outlet and feeding nipple.

15. The structure defined in claim 14 in which said switch is mounted on said structure exterior of said chamber, said actuator comprising a lever mounted in said outlet and having an arm extending generally longitudinally within said nipple, and linkage connected to said lever and having operative engagement with said switch.

16. In an automatic liquid food mixer and animal feeder; structure defining a reservoir for finely divided granular dry food and a mixing chamber having an outlet in its bottom portion; means for automatically delivering a predetermined quantity of liquid to said mixing chamber; power operated mechanism for dispensing a predetermined quantity of said dry food from the reservoir to the mixing chamber; an agitator in said mixing chamber; means for driving said agitator; a collapsible resilient bulbous suckling nipple secured to said outlet and communicating with said mixing chamber; a discharge valve controlling discharge of material through said outlet; operating mechanism for said valve; and control means for said liquid delivery means, dispensing mechanism, agitator driving means and discharge valve operating mechanism and including a control element for rendering said valve operating mechanism operative to permit the mixed material to be drawn from the chamber through said nipple by a suckling animal only after delivery of a predetermined quantity of said liquid and dry food to the mixing chamber and mixing thereof, said control means further including a control element operatively associated with said nipple and operated by the animal incidental to its manipulation of the nipple to initiate operation of the agitator driving means during discharge of said material through said outlet.

17. The structure defined in claim 16 in which said agitator driving means comprises an electric motor, and in which said last mentioned control element comprises a switch for said motor, said switch having an operating element responsive to changes in atmospheric pressure within said nipple to alternately open and close said switch.

18. In an automatic liquid food mixer and animal feeder; structure defining a reservoir for finely divided granular dry food and a mixing chamber having an outlet in its bottom portion; means for automatically delivering a predetermined quantity of liquid to said mixing chamber; mechanism for dispensing a predetermined quantity of said dry food from the reservoir to said mixing chamber; an agitator in said mixing chamber; means for driving said agitator; a collapsible resilient bulbous suckling nipple secured to said outlet and communicating with said mixing chamber; a discharge valve controlling discharge of material through said outlet; operating mechanism for said valve; and control means for said liquid delivery means, dispensing mechanism, agitator driving means and discharge valve operating mechanism and including a pressure operated control element responsive to an increase in pressure within said nipple to initiate operation of the agitator driving means during discharge of said material through said outlet.

19. In an automatic liquid food mixer and animal feeder; structure defining a reservoir for finely divided granular dry food and a mixing chamber having an outlet in its bottom portion; means for automatically delivering a predetermined quantity of liquid to said mixing chamber; mechanism for dispensing a predetermined quantity of said dry food from the reservoir to said mixing chamber; an agitator in said mixing chamber; means for driving said agitator; a collapsible resilient bulbous suckling nipple secured to said outlet and communicating with said mixing chamber; a discharge valve controlling discharge of material through said outlet; operating mechanism for said valve; and control means for said liquid delivery means, dispensing mechanism and discharge valve operating mechanism and including, a control element in said mixing chamber responsive to delivery of liquid to a predetermined level in said chamber to render said valve operating mechanism operative to permit discharge of material through said valve, and a pressure operated control element responsive to an increase in atmospheric pressure within said nipple to initiate operation of the agitator driving means during dscharge of said material through said outlet.

20. In an automatic liquid food mixer and animal feeder; structure defining a reservoir for finely divided granular dry food and a mixing chamber having an outlet in its bottom portion; means for automatically delivering a predetermined quantity of liquid to said mixing chamber; mechanism for dispensing a predetermined quantity of said dry food from the reservoir to said mixing chamber; a collapsible resilient bulbous suckling nipple secured to said outlet and communicating with said mixing chamber; a discharge valve controlling discharge of material through said outlet; operating mechanism for said valve; and control means for said liquid delivery means, dispensing mechanism and discharge valve operating mechanism, said control means including a control device responsive to accumulation of liquid to a predetermined high level in said chamber to render said discharge valve operating mechanism operative to permit the mixed material to be drawn from the mixing chamber through said nipple by a suckling animal, and responsive to a predetermined drop in the liquid level in said chamber to render said discharge valve operating mechanism inoperative to permit the mixed material to be drawn from the mixing chamber through said nipple by a suckling animal.

21. In an animal feeding device, a container for fluid animal food, said container having an outlet adjacent the lowermost portion thereof, a valve in said outlet, a flexible resilient animal feeding nipple connected to said outlet, pressure responsive means associated with said nipple and said valve for controlling the position and operation of said valve.

22. The structure defined in claim 21, including means supplying liquid and dry material to said container, means operable by the level of the material in said container to control said supply means, said last means being under the control of said pressure responsive means.

23. The structure as defined in claim 22, including means preventing operation of said pressure responsive means until a predetermined amount of material is discharged into said container.

24. In an animal feeding device as defined in claim 21, fluid level responsive means in said container for restoring the fluid level therein to a predetermined high level upon the reduction of said fluid level to a predetermined low level, and said fluid level responsive means being associated with the valve in said outlet for rendering said valve inoperative in response to demand at the nipple during the time that the fluid level is being restored to said high level.

25. In a suckling animal feeder, a flexible resilient animal feeding nipple, liquid supply means for the nipple and adapted to supply liquid to the nipple, means controlling communication between the supply means and the nipple and including a cyclic flow control device between said supply means and the nipple, and actuator means for said control device operative to interrupt availability of liquid at the nipple and to automatically reestablish said availability of liquid at the nipple upon elapse of an approximate predetermined time interval subsequent to said interruption and irrespective of demand at the nipple by a suckling animal.

26. In a suckling animal feeder, a flexible resilient animal feeding nipple, liquid supply means for the nipple and adapted to supply liquid to the nipple, means controlling communication between the supply means and the nipple and comprising a power operated cyclic flow control device between the supply means and the nipple and having actuator means including time delay apparatus controlling operation of said flow control device to interrupt availability of liquid at the nipple and to automatically reestablish said availability of liquid upon a lapse of an approximate predetermined time interval subsequent to said interruption and irrespective of demand at the nipple by a suckling animal.

27. In a suckling animal feeder, a resilient flexible animal feeding nipple, liquid supply means connected to the nipple and adapted to supply liquid at the nipple, valve means controlling communication between the supply means and the nipple, and cyclic control means associated with said valve means and responsive to delivery of a predetermined quantity of liquid to said nipple during one cycle of operation to cause the valve means to positively close off communication between the nipple and the supply means during another cycle of operation irrespective of demand at the nipple.

28. In a suckling animal feeder including means for providing a relatively large volume source of liquid supply and a resilient flexible animal feeding nipple connected to and receiving liquid from said liquid supply means on demand at the nipple; the improvement comprising cyclic means also connected to and associated with the liquid supply to said nipple for alternately interrupting and renewing said supply irrespective of demand at said nipple.

29. In a cyclic liquid animal food mixing and feeding device, comprising a storage container for a relatively large volume of said liquid food, means operable to discharge a predetermined relatively small volume quantity of the liquid from said device, an animal feeding nipple connected to and receiving the liquid from said device on demand at the nipple, an automatic check valve for said nipple, and lapse time operating means associated with the discharge means and operable alternately to interrupt and renew availability of liquid from said device irrespective of demand at the nipple.

30. In a suckling animal feeder including a container for a quantity of liquid animal food having an outlet, a resilient and flexible animal feeding nipple connected to said outlet, a check valve associated with said outlet and nipple and operable by the latter on demand at the nipple for food from said container, a relatively large volume source of animal food, and periodically operable delivery means associated with said source and said container for discharging food from the former into the latter at regular timed intervals.

31. In a suckling animal feeder including a container for a quantity of liquid animal food having an outlet, a resilient and flexible animal feeding nipple connected to said outlet, a check valve associated with said outlet and nipple and operable by the latter on demand at the nipple for food from said container, a relatively large volume source of animal food, conveying means connecting said source with said container, and elapsed time controlled means operable on exhaustion of a quantity of food in said container for actuating said conveying means, irrespective of said demand at the nipple.

32. In a suckling animal feeder including a container for a quantity of liquid animal food having an outlet, a resilient and flexible animal feeding nipple connected to said outlet, a check valve associated with said outlet and nipple and operable by the latter on demand at the nipple for food from said container, and elapsed time controlled means operable on exhaustion of predetermined quantities of food in said container and also associated with said outlet for controlling the delivery of food therethrough irrespective of demands at said nipple.

33. In a suckling animal feeder including a container for a quantity of liquid animal food having an outlet, a resilient and flexible animal feeding nipple connected to said outlet, a check valve associated with said outlet and nipple and operable by the latter on demand at the nipple for food from said container, and periodically operable discharge means also associated with said outlet for controlling the delivery of food therethrough irrespective of demands at said nipple.

References Cited in the file of this patent
UNITED STATES PATENTS

| | | |
|---|---|---|
| 2,263,069 | Coyner | Nov. 18, 1941 |
| 2,452,933 | Shoppick et al. | Nov. 2, 1948 |
| 2,642,837 | Schroeder | June 23, 1953 |
| 2,714,368 | Voigt et al. | Aug. 2, 1955 |